US012504080B2

United States Patent
Cox et al.

(10) Patent No.: US 12,504,080 B2
(45) Date of Patent: Dec. 23, 2025

(54) GATE VALVE SEATS AND SEALS, KITS, AND ASSOCIATED METHODS TO ENHANCE OPERATING LIFE OF GATE VALVES

(71) Applicant: ServicePlus LLC, Houston, TX (US)

(72) Inventors: Jacob Cox, Houston, TX (US); Sean Gajic, Houston, TX (US); Nicholas Peter Gette, Houston, TX (US)

(73) Assignee: ServicePlus LLC, Houston, TX (US)

( * ) Notice: Subject to any disclaimer, the term of this patent is extended or adjusted under 35 U.S.C. 154(b) by 0 days.

(21) Appl. No.: 19/087,153

(22) Filed: Mar. 21, 2025

(65) Prior Publication Data

US 2025/0314306 A1    Oct. 9, 2025

Related U.S. Application Data

(60) Provisional application No. 63/715,394, filed on Nov. 1, 2024, provisional application No. 63/575,485, filed on Apr. 5, 2024.

(51) Int. Cl.
*F16K 3/02* (2006.01)
*F16K 27/04* (2006.01)

(52) U.S. Cl.
CPC .......... *F16K 3/0227* (2013.01); *F16K 27/044* (2013.01)

(58) Field of Classification Search
CPC .............................. F16K 3/0227; F16K 27/044
See application file for complete search history.

(56) References Cited

U.S. PATENT DOCUMENTS 3,245,655 A * 4/1966 Oetjens ................. F16K 5/0668
277/369
3,696,831 A * 10/1972 Fowler ..................... F16K 3/36
251/327

(Continued)

FOREIGN PATENT DOCUMENTS

| CN | 104329460 | 2/2015 |
| WO | 2022204020 | 9/2022 |

OTHER PUBLICATIONS

International Search Report and Written Opinion for international application No. PCT/US2025/021448, mailed on Jun. 11, 2025.

*Primary Examiner* — John Bastianelli
(74) *Attorney, Agent, or Firm* — Womble Bond Dickinson (US) LLP

(57) ABSTRACT

Gate valve embodiments, including assemblies, seats and seals, kits, and associated methods, are provided to improve operational performance by a reduction of particle intrusion at associated seals. In an embodiment, a gate valve has an actuator, a gate connected to the actuator, a valve body, and a valve seat with a debris protection seal thereon and one or more debris cavities therein. The valve seat is positioned in a bore of the valve body. The debris protection seal is positioned in a seal recess of the valve seat to contact a distal radial wall of the bore to elongate a debris path, thereby to reduce debris migration to the bore that causes leaks. The debris cavities are positioned in a distal surface of the valve seat to capture debris that has migrated through the debris protection seal, further reducing debris migration to the bore that causes valve leaks.

30 Claims, 21 Drawing Sheets

(56) References Cited

U.S. PATENT DOCUMENTS

| | | | | |
|---|---|---|---|---|
| 4,055,325 | A * | 10/1977 | Vyvial | F16K 3/186 29/458 |
| 4,440,381 | A | 4/1984 | Tipton, Jr. | |
| 4,741,509 | A | 5/1988 | Bunch et al. | |
| 5,341,835 | A * | 8/1994 | Lanning, II | F16K 3/0227 137/246.22 |
| 6,279,875 | B1 | 8/2001 | Chatufale | |
| 6,966,537 | B2 | 11/2005 | Sundararajan | |
| 7,562,859 | B2 | 7/2009 | Lam et al. | |
| 7,770,899 | B1 | 8/2010 | Durham | |
| 8,205,890 | B2 | 6/2012 | Sundararajan | |
| 8,403,290 | B2 | 3/2013 | Delbridge et al. | |
| 9,115,814 | B2 | 8/2015 | Sun et al. | |
| 9,267,606 | B2 | 2/2016 | Håland | |
| 9,453,578 | B2 * | 9/2016 | Sundararajan | F16K 3/0236 |
| 9,897,215 | B2 | 2/2018 | Hunter et al. | |
| 9,989,157 | B2 | 6/2018 | Hunter | |
| 10,054,238 | B2 | 8/2018 | Watterodt et al. | |
| 10,077,844 | B2 | 9/2018 | Parks, Jr. | |
| 10,184,311 | B2 | 1/2019 | Gadre et al. | |
| 10,240,678 | B2 | 3/2019 | Toth | |
| 10,281,047 | B2 | 5/2019 | Scattini | |
| 10,378,659 | B2 | 8/2019 | Scott et al. | |
| 10,451,187 | B2 | 10/2019 | Roberts | |
| 10,663,068 | B2 | 5/2020 | Puranik et al. | |
| 10,683,722 | B2 | 6/2020 | Puranik et al. | |
| 10,794,494 | B2 | 10/2020 | Abouelleil et al. | |
| 10,961,816 | B1 | 3/2021 | Church | |
| 10,995,863 | B2 | 5/2021 | Ungchusri et al. | |
| 11,174,958 | B2 | 11/2021 | Moseley et al. | |
| 11,243,102 | B2 | 2/2022 | Fenn et al. | |
| 11,435,001 | B2 * | 9/2022 | Kalimuthu | F16K 27/044 |
| 11,499,644 | B2 | 11/2022 | Nguyen et al. | |
| 11,512,783 | B2 | 11/2022 | Vijay | |
| 11,525,332 | B2 | 12/2022 | Dwairy et al. | |
| 11,543,036 | B1 | 1/2023 | Bailuk | |
| 11,549,594 | B2 | 1/2023 | Sundararajan | |
| 11,585,445 | B1 | 2/2023 | Daniels et al. | |
| 11,644,105 | B2 | 5/2023 | Sundararajan | |
| 11,686,394 | B2 | 6/2023 | Feng | |
| 11,761,301 | B2 | 9/2023 | Fox et al. | |
| 11,802,461 | B2 | 10/2023 | Dwairy et al. | |
| 11,913,313 | B2 | 2/2024 | Albert | |
| 12,110,979 | B1 | 10/2024 | Horvath et al. | |
| 12,287,041 | B1 | 4/2025 | Gramlich et al. | |
| 2006/0038155 | A1 | 2/2006 | Lam | |
| 2012/0211690 | A1 | 8/2012 | Anderson et al. | |
| 2012/0228537 | A1 | 9/2012 | Kahn | |
| 2014/0110615 | A1 * | 4/2014 | Fukano | F16K 5/201 251/231 |
| 2014/0183392 | A1 | 7/2014 | Hunter et al. | |
| 2015/0021908 | A1 | 1/2015 | Cronin et al. | |
| 2017/0191570 | A1 | 7/2017 | Roberts | |
| 2021/0215255 | A1 | 7/2021 | Kalimuthu | |
| 2022/0196161 | A1 | 6/2022 | Burlot et al. | |
| 2024/0102558 | A1 | 3/2024 | McGuire et al. | |
| 2025/0075803 | A1 | 3/2025 | Gramlich et al. | |
| 2025/0075804 | A1 | 3/2025 | Gramlich et al. | |

\* cited by examiner

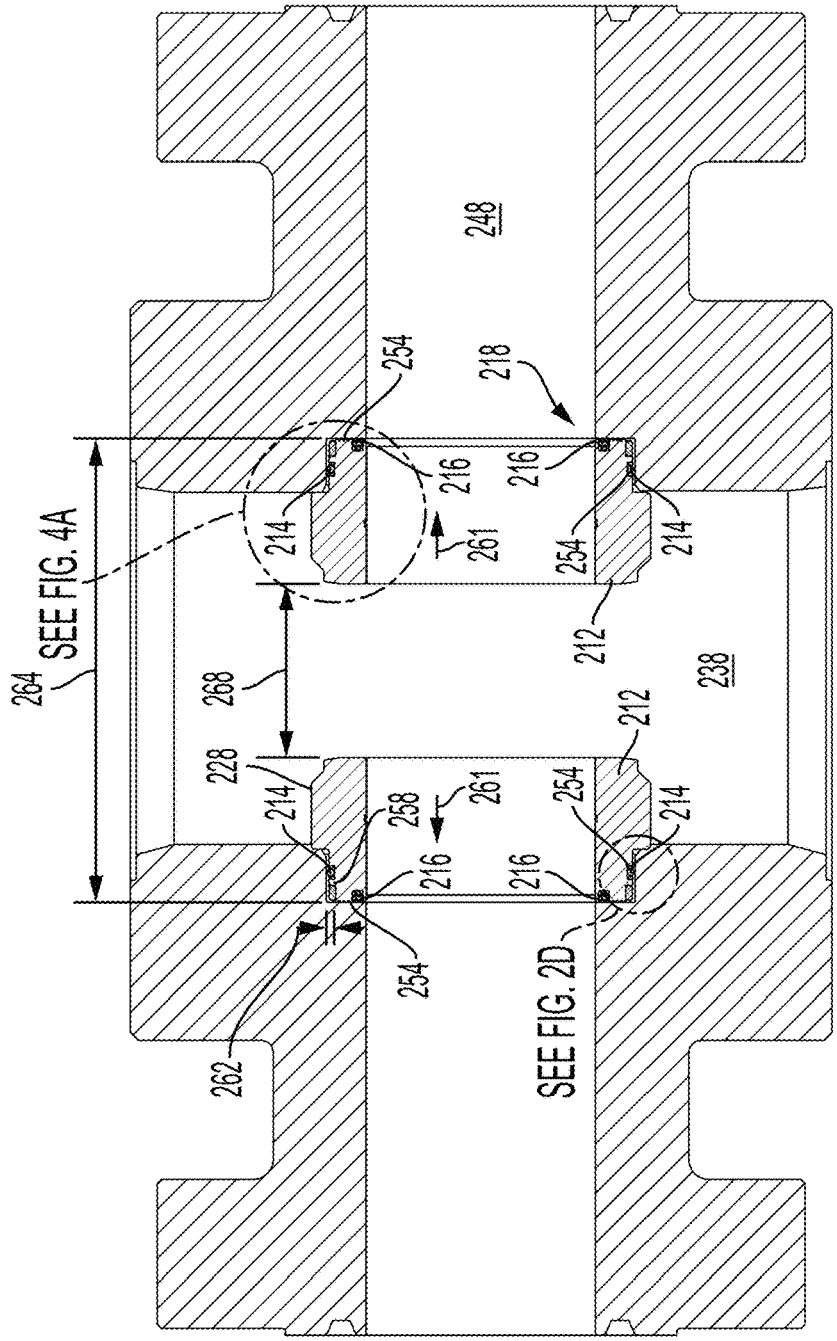
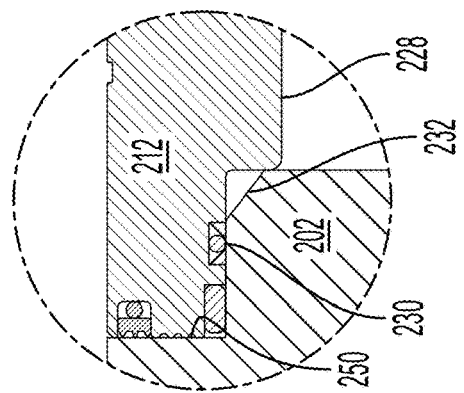
FIG. 2C
FIG. 2D

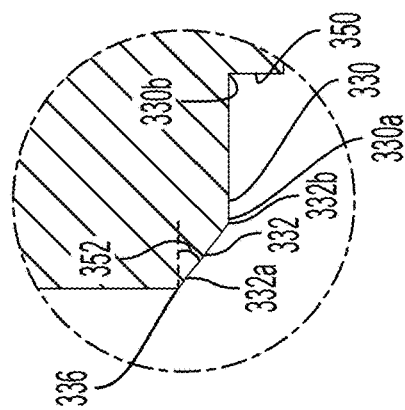
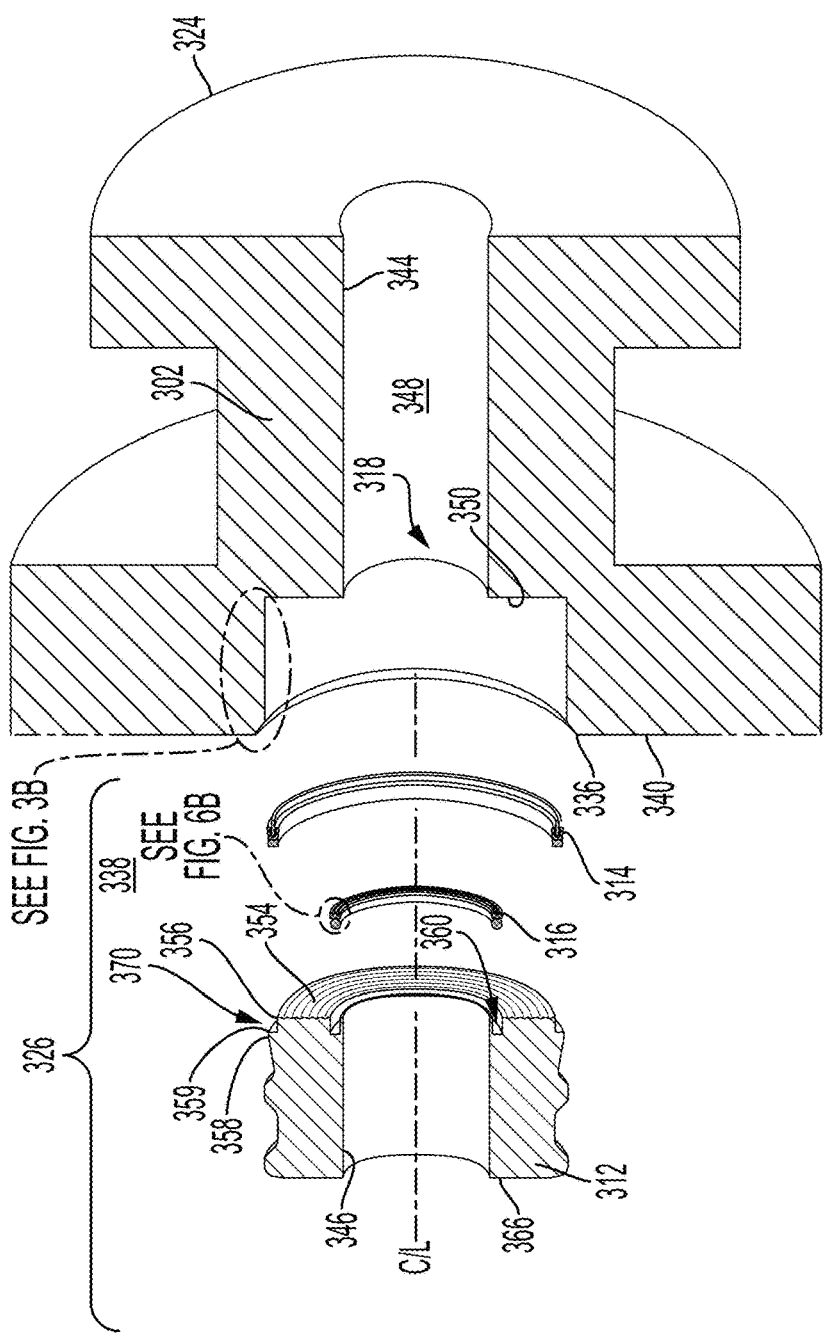
FIG. 3B
FIG. 3A

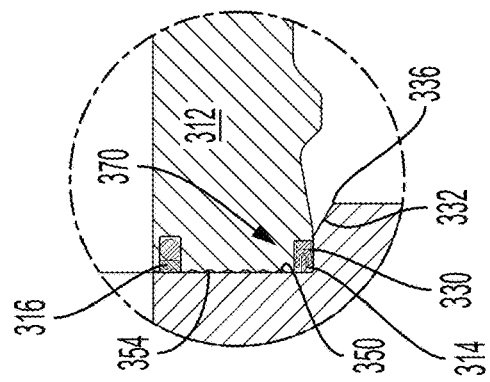
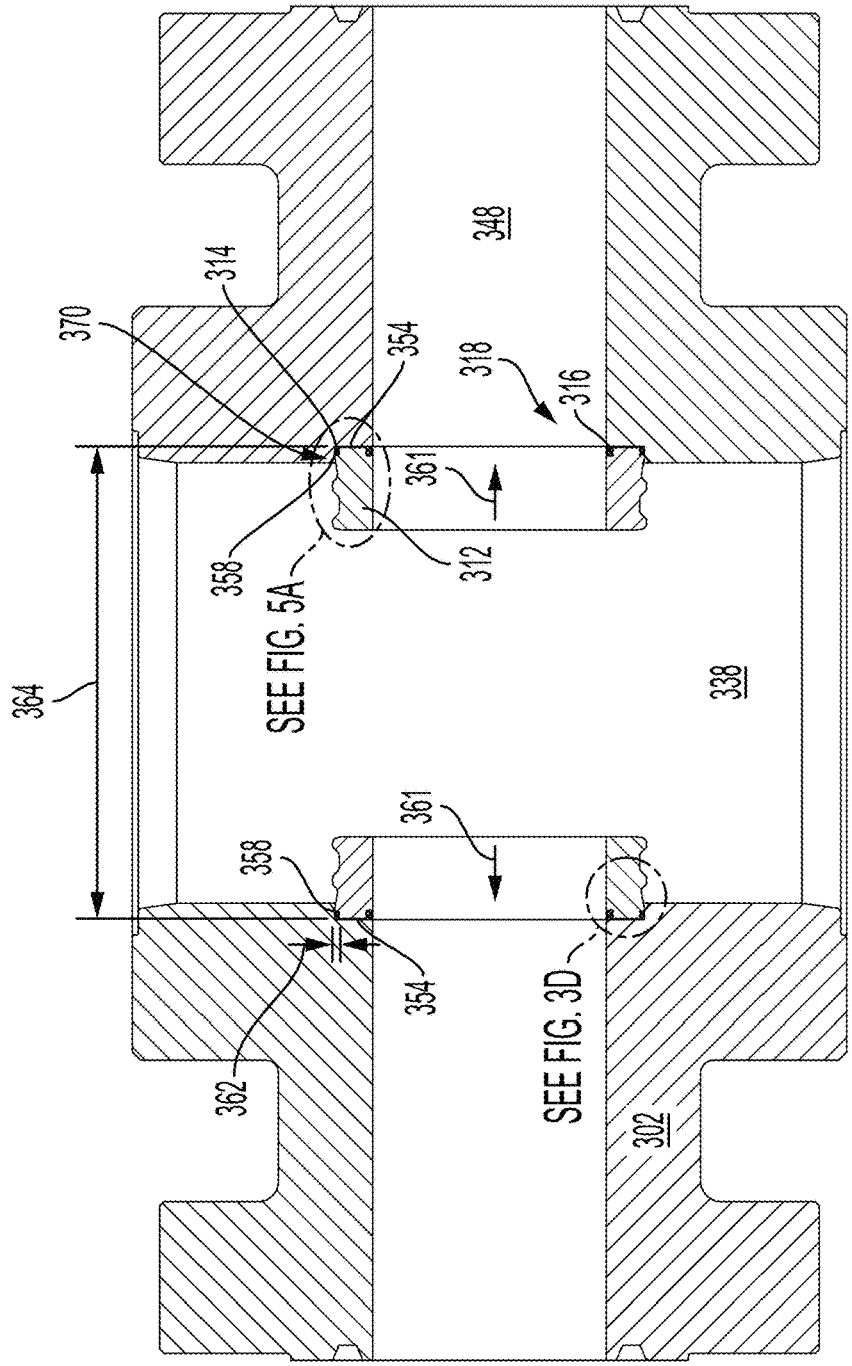
FIG. 3D
FIG. 3C

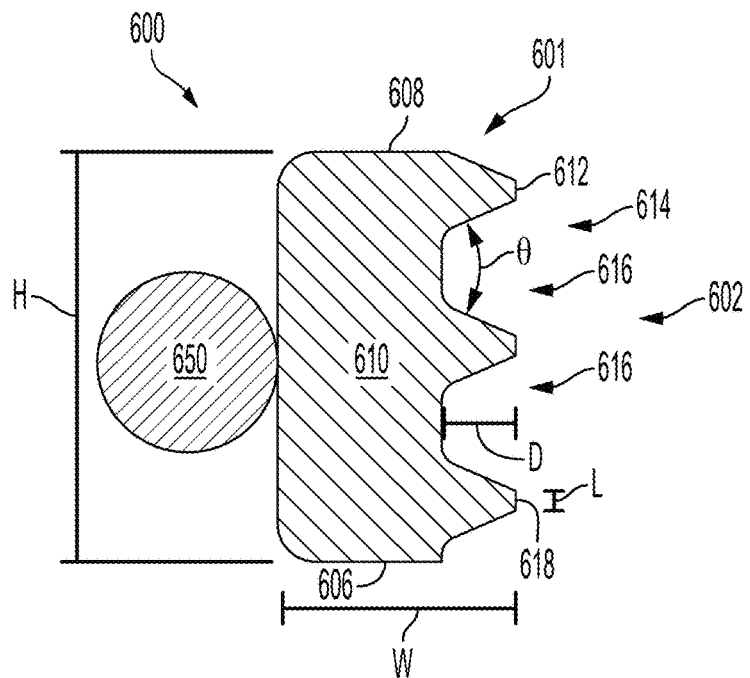
FIG. 6A
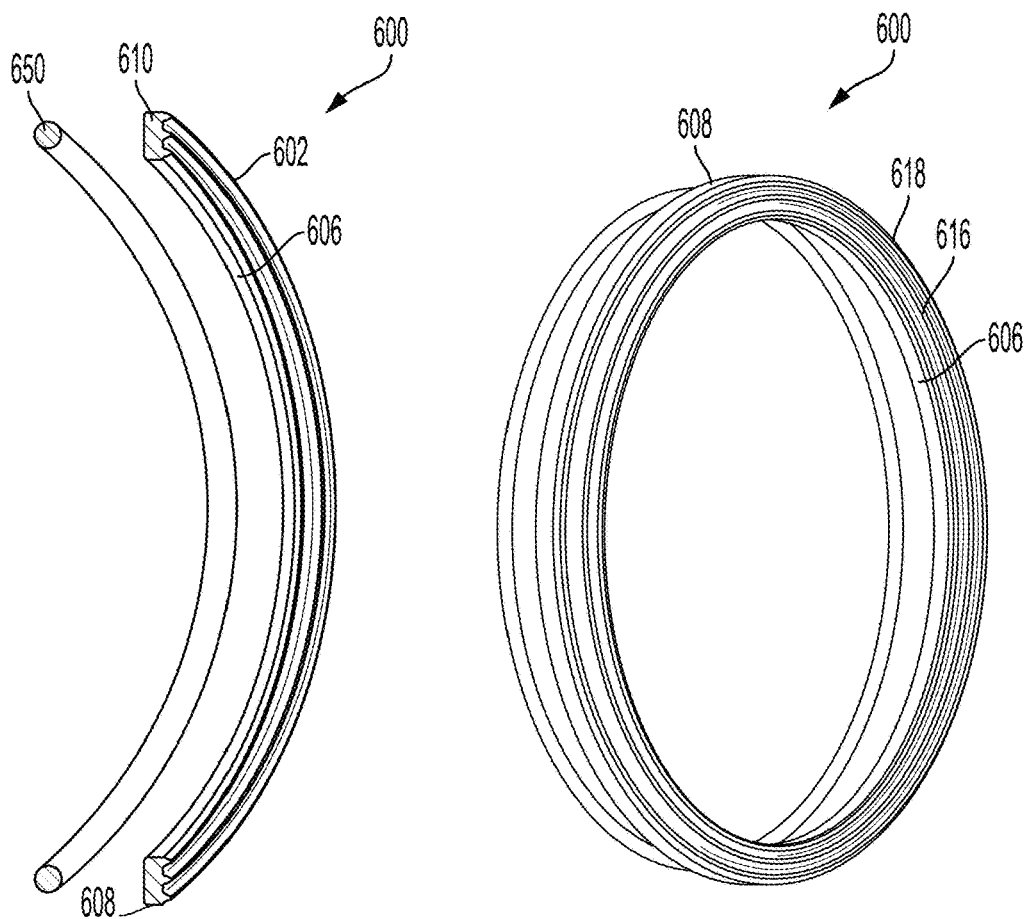
FIG. 6B
FIG. 6C

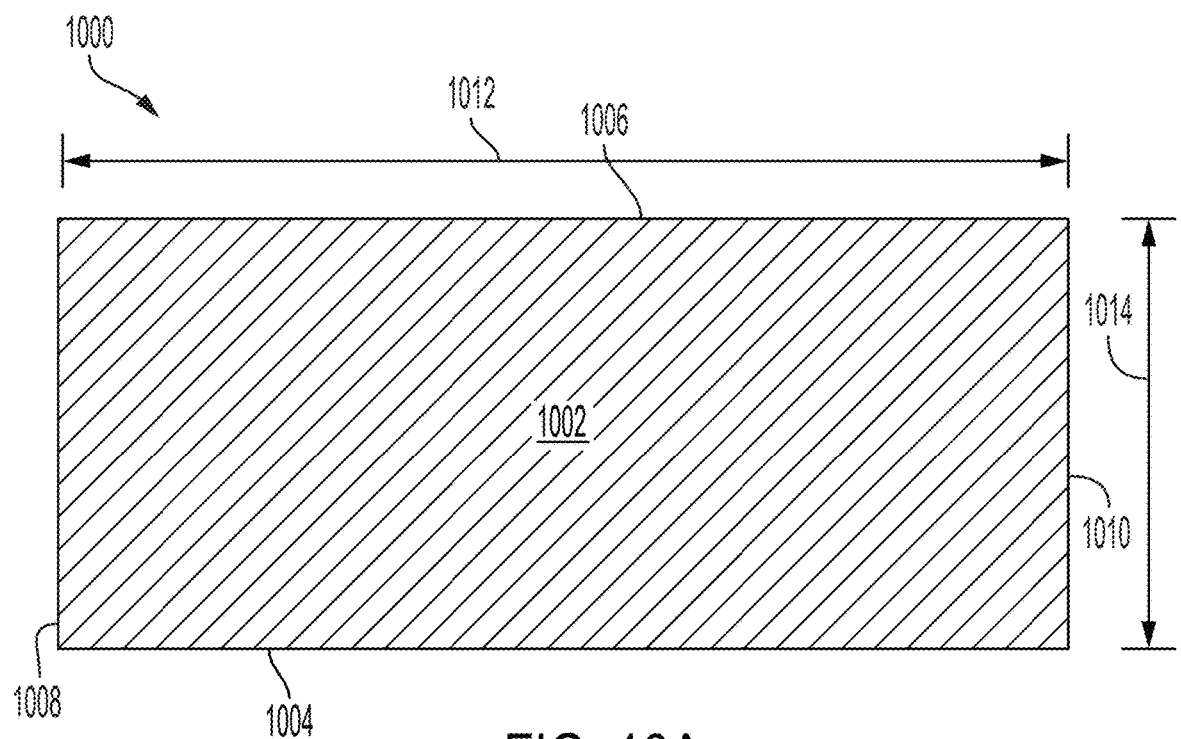
FIG. 10A
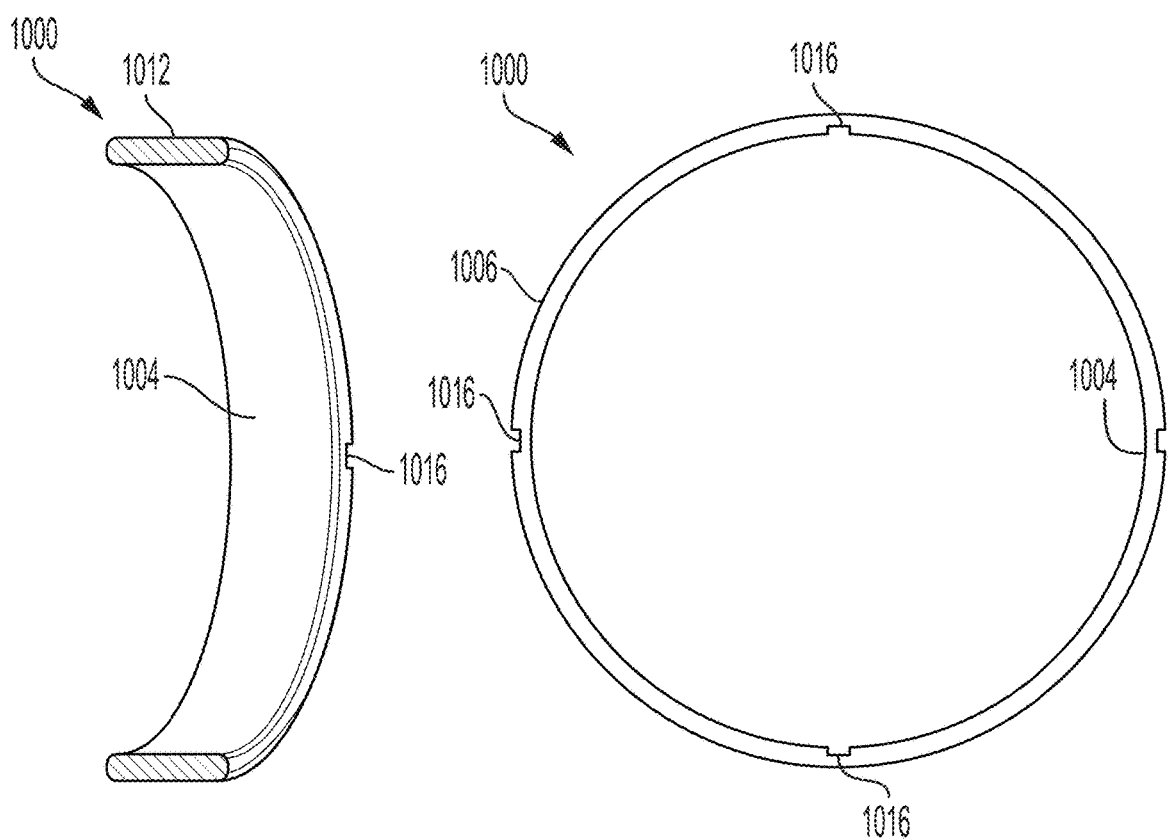
FIG. 10B
FIG. 10C

GATE VALVE SEATS AND SEALS, KITS, AND ASSOCIATED METHODS TO ENHANCE OPERATING LIFE OF GATE VALVES

CROSS REFERENCE TO RELATED APPLICATIONS

This U.S. non-provisional patent application claims priority to and the benefit of U.S. Provisional Application No. 63/575,485 filed Apr. 5, 2024, titled "GATE VALVES, GATE VALVE ASSEMBLIES, GATE VALVE SEATS AND SEALS, KITS, AND ASSOCIATED METHODS TO ENHANCE OPERATING LIFE OF GATE VALVES," and U.S. Provisional Application No. 63/715,394, filed Nov. 1, 2024, titled "GATE VALVE SEATS AND SEALS, KITS, AND ASSOCIATED METHODS TO ENHANCE OPERATING LIFE OF GATE VALVES," the disclosures of which are incorporated herein by reference in their entireties.

TECHNICAL FIELD

The present disclosure generally relates gate valves and methods for increased gate valve operational performance and service life. More specifically, the present disclosure relates to embodiments of gate valves and associated methods to increase gate valve operational performance and service life by a mitigation of risks that cause valve leaks.

BACKGROUND

Oil and gas fluid extraction operations may cause, for example, underground sediment to mix with a desired extraction fluid. The undesired sediment may be produced along with the desired extraction fluid at elevated pressures or temperatures necessitating conditioning by a series of control or on-off valves. These valves may experience unideal conditions as sediment flowing through the produced fluid may contaminate surfaces of seals causing valve leaks over time. For example, gate valves contain several components that are potential sources of valve leaks in dirty service operations, such as oil and gas fluid extraction operations, including slurries in fracturing operations or reservoir oil production. In particular, interior portions of gate valves, such as gate valve seats, are susceptible to damage from sediment. Gate valve seats have been known to cause leaks as the associated seals may experience an invasion of granular particles that damage or significantly reduce a sealing power of the gate valve seats within the gate valve pockets during fluid flow operations. Additionally, conventional gate valves implement grease to prevent seizure of the valve that leads to a saturation of captured particles near the seat seal area. The grease has been known to fail as it may dry or retain many particles producing a grit that causes physical damage to the valve. Efforts have been implemented to reduce the amount of grease necessary for proper valve operation while maintaining proper scaling in dirty fluid operations. However, there remains a need for increased gate valve operational performance and service life beyond conventional gate valve limitations.

SUMMARY

Applicant has recognized that the implementation of conventional seals has not achieved the desired longevity of the valve, and thus, frequent grease and seal replacement often is required for continued operation. Applicant has recognized that invasion of granular particles between a valve seat and a throughbore of the gate valve that may cause damage or significantly reduce a sealing power of the gate valve seats within gate valve pockets, thereby causing valve failures, e.g., valve leaks or valve seizure, and necessitating damage repair. Embodiments of the present disclosure reduce, or eliminate, usage of grease that is known to accumulate granular particles causing damage, e.g., scoring of surfaces that would otherwise be smooth for sealing purposes.

Embodiments of the disclosure, for example, include gate valves and methods to increase gate valve performance and service life. In an embodiment, for example, a gate valve includes a valve actuator, a gate, a valve body, and a valve seat. The gate is connected to the valve actuator so that the valve actuator actuates the gate during fluid flow operation. The valve body has a throughbore that extends through the valve body, a cavity that has an opening positioned transversely to and in fluid communication with the throughbore to position the gate therein, and a profile at a connection of the throughbore and the cavity. The profile includes a bore concentrically aligned with the throughbore and a tapering portion positioned to extend from the cavity to the bore. The bore has a diameter greater than the throughbore and a distal radial wall extending from the bore to the throughbore. The valve seat is positioned in the bore and has (a) a debris protection seal positioned in a seal recess of the valve seat to abuttingly contact the distal radial wall of the bore so as to provide an increased surface area that elongates a debris path by a debris particle to reach the bore, thereby to reduce debris migration to the bore during fluid flow operation that cause an increased risk of leaks, and (b) one or more debris cavities positioned in a distal surface of the valve seat, thereby to capture debris that has migrated through the debris protection seal during fluid flow operation to further reduce debris migration to the bore.

In another embodiment, the valve seat further includes (c) a seat pressure seal positioned in abutting contact between the bore and the valve seat to provide a seal power to reduce leaks during fluid flow operation. Further, the debris protection seal and the one or more debris cavities reduce debris migration to seat pressure seal, thereby to reduce a risk of leaks from debris interference of the sealing power of the seat pressure seal.

In some embodiments, the seat pressure seal includes a male portion engaged with a female portion in abutting contact to compress axially, thereby to sealingly expand radially. The male portion of the seat pressure seal includes a first male spreader ring. The female portion includes a first female seal member that has a first opening configured to receive the first male spreader ring to sealingly abut the first female seal member to the bore of the valve body and the valve seat.

In another embodiment, the seat pressure seal further includes a second female seal member having a second opening configured to receive a second male spreader ring to sealingly abut the second female seal member to the bore of the valve body and the valve seat. Further, the first female seal member abuttingly and directly contacts the second female seal member.

In still another embodiment, the first female seal member includes a backside, opposite the first opening, positionable to be in abutting contact with a complementing alignment ring positioned to be in abutting contact with a radial projection of the valve seat.

In yet another embodiment, the seat pressure seal includes a first seat pressure seal, the valve seat further includes a second pocket configured to position a second seat pressure seal therein, and the second seat pressure seal includes a t-seal ring, an s-seal ring, or an o-ring seal.

In another embodiment, the o-ring seal comprises an o-ring straddled and positionably maintained by two adjacent scarf-cut rings, each of the scarf-cut rings having a tapering surface narrowing from a top surface to a bottom surface, the tapering surface of each of the scarf-cut rings in abutting contact with the o-ring such that each top surface has an outer diameter greater than a diameter of a cross-sectional center of the o-ring.

The debris protection seal, in another example, includes an annular body that has (a) a distal surface, (b) a proximate surface opposite the distal surface, (c) an outer diameter surface extending between the distal surface and the proximate surface, and (d) an inner diameter surface parallel to the outer diameter surface. Further, the distal surface has a grooved pattern positioned therein to be abuttingly contact the distal radial wall of the valve body. In an additional embodiment, the grooved pattern is a spiral so as to increase surface area to elongate the debris path by the debris particle to reach a seat pressure seal, thereby to reduce a risk of leaks from debris interference of a sealing power of the seat pressure seal when in operation.

In another embodiment, the debris protection seal further includes an o-ring positioned in the seal recess of the valve seat and in abutting contact with the proximate surface of the annular body and the valve seat. The annular body is thrusted towards the distal radial wall by the o-ring such that the o-ring is compressed to energize the debris protection seal into abutting contact with the distal radial wall of the valve body to reduce debris migration towards the seat pressure seal when in operation.

In yet another embodiment, the valve seat further includes (c) an alignment collar positioned in abutting contact between the bore and the valve seat to provide enhanced operation of other sealing components when in operation.

The one or more debris cavities are each shaped as substantially half circles in the distal surface of the valve seat such that a substantially flat portion of the distal surface straddles adjacent debris cavities in another embodiment. Further, the one or more debris cavities include at least three debris cavities equidistantly spaced from each other.

In some embodiments, the valve seat further includes a distal end, a proximal end, an inner diameter surface, and an outer diameter end. The distal end has an outer edge defined by a connection of a first outer diameter surface and the distal surface of the valve seat. The distal surface extends from the outer edge to the inner diameter surface of the valve seat and includes, in sequence, the one or more debris cavities, a seal recess, and a ledge defined by the seal recess and a connection of the distal surface and the inner diameter surface of the valve seat. The proximal end has a proximal surface that extends from a first angled wall connected to a sixth outer diameter surface of the valve seat and a second angled wall connected to the inner diameter surface of the valve seat. The inner diameter surface has a diameter substantially similar to a diameter of the throughbore and extending from the second angled wall of the proximal end to the ledge. The inner diameter surface further has a recess to engage a retraction tool during maintenance. The outer diameter end has a first pocket defined by the outer edge and a connection between the first outer diameter surface and a radial projection. The first pocket is configured to position a seat pressure seal therein when installed. The radial projection separates the first pocket and a second pocket and further has a second outer diameter surface that extends between the first pocket and the second pocket. The second pocket is defined by the radial projection, a third outer diameter surface, and a radial wall that extends from the third outer diameter surface to a shoulder connecting a fourth outer diameter surface to the radial wall. The second pocket is configured to position a second seat pressure seal therein when installed. The outer diameter end further has a fifth outer diameter surface, a third angled wall that extends from the fifth outer diameter surface to the sixth outer diameter surface, and the fifth outer diameter surface that has a diameter greater than the fourth outer diameter surface or the sixth outer diameter surface.

In alternative embodiments, the valve seat further includes a distal end, a proximal end, an inner diameter surface, and an outer diameter end. The distal end has an outer edge defined by a connection of a first outer diameter surface and the distal surface of the valve seat. The distal surface extends from the outer edge to the inner diameter surface of the valve seat and includes, in sequence, the one or more debris cavities, a seal recess, and a ledge defined by the seal recess and a connection of the distal surface and the inner diameter surface of the valve seat. The proximal end has a proximal surface that extends from a fifth outer diameter surface of the valve seat to the inner diameter surface of the valve seat. The inner diameter surface has a diameter substantially similar to a diameter of the throughbore and extends from the proximal end to the distal end. The outer diameter end has a pocket defined by the outer edge and a connection between the first outer diameter surface and a radial projection. The pocket is configured to position a seat pressure seal therein when installed. The radial projection has a second outer diameter surface that extends from the pocket to a seat profile. The seat profile extends between the second outer diameter surface and a third outer diameter surface and has an inner diameter less than a diameter of second outer diameter surface. The third outer diameter surface has a diameter greater than the diameter of second outer diameter surface. A fourth outer diameter surface is positioned between and connected to the third outer diameter and the fifth outer diameter surface and has a diameter less than the third outer diameter and a fifth outer diameter surface. The fifth outer diameter surface is connected to the proximal end.

In another embodiment of the present disclosure, for example, a method to retrofit a gate valve for enhanced valve performance includes disassembling a preassembled gate valve by removing internal component portions to expose a throughbore in a valve body such that a throughbore is accessible for machining, machining a portion of the throughbore of the valve body, thereby to define a profile to be positioned adjacent a cavity of the valve body and configured to house the internal component portions of the gate valve so as to define a machined portion, positioning a valve seat that has one or more debris cavities on a distal surface, a seat pressure seal, and a debris protection seal in the machined portion, and reassembling the gate valve with the internal component portions and with, thereby to define a retrofitted gate valve.

In some embodiments, the valve seat further includes a first one of: (I) a second seat pressure seal or (II) an alignment collar.

In yet another embodiment, the valve seat further includes a second seat pressure seal adjacent the first pressure seal.

In an embodiment of the present disclosure, for example, a method of use to protect against leaks in a gate valve during operation includes flowing fluid through a throughbore of a valve body of a gate valve. The valve body also includes (a) a gate to control fluid flow through the throughbore, (b) a valve seat, (c) a bore, (d) a first seat pressure seal positioned between the bore and the valve seat to provide a constant sealing power during a movement of the gate that controls fluid flow through the throughbore, and (e) a debris protection seal in abutting contact with a distal radial wall of the valve body. The method further includes causing an elongated debris trajectory via an increase of surface area with the debris protection seal when the fluid flows through the throughbore so as to reduce a risk of debris interference of the constant sealing power of the first seat pressure seal during fluid flow operation and moving the gate to substantially stop fluid flow through the throughbore so as to produce an axial force applied to the valve seat. Additionally, the method includes engaging one or more debris cavities positioned on a distal surface of the valve seat to a distal radial wall responsive to the movement of the gate, thereby to capture debris that bypassed the debris protection seal during fluid flow operation and reduce debris migration to the first seat pressure seal. The method continues by compressing, in response to the axial force applied to the valve seat, an o-ring positioned to drive the debris protection seal to maintain abutting contact with the distal radial wall, thereby to maintain the elongated debris trajectory during and after movement of the gate and reduce debris infiltration towards the first seat pressure seal, Furthermore, the method continues by sealingly expanding a second seat pressure seal in a radial direction to seal between the bore and the valve seat to produce a redundant seal with the first seat pressure seal as a response to the movement of the gate, thereby to increase a sealing power of the gate valve when the gate valve is substantially closed.

Aspects and advantages of these exemplary embodiments and other examples, are discussed in detail herein. Moreover, it is to be understood that both the foregoing information and the following detailed description provide merely illustrative examples of various aspects and embodiment and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood by those skilled in the art that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the many ways in which they may be practiced. According to common practice, as will be understood by those skilled in the art, the various features of the drawings discussed below are not necessarily drawn to scale. Dimensions of various features and elements in the drawings may be expanded or reduced to illustrate embodiments of the disclosure more clearly.

FIG. 2C is a sectional view of an integrated gate valve body with a valve seat, including a debris protection seal, positioned within the seat recess, according to an embodiment of the disclosure.

FIG. 2D is an enlarged view of the valve body seat profile including the seat installation taken along the lines of FIG. 2D of the gate valve body of FIG. 2C, according to an embodiment of the disclosure.

FIG. 3A is an exploded sectional view of a gate valve body having a seat assembly, in a full-bore embodiment of the disclosure, according to another embodiment of the present disclosure.

FIG. 3B is an enlarged view of the valve body seat profile taken along the lines of FIG. 3B of the gate valve body of FIG. 3A, according to an embodiment of the disclosure.

FIG. 3C is a sectional view of an integrated gate valve body with a valve seat, including a debris protection seal, positioned within the seat recess, according to an embodiment of the disclosure.

FIG. 3D is an enlarged view of the valve body seat profile including the seat installation taken along the lines of FIG. 3D of the gate valve body of FIG. 3C, according to an embodiment of the disclosure.

FIG. 6A is a sectional view of a debris protection seal, according to an embodiment of the disclosure.

FIG. 6B is a partial perspective view of the debris protection seal, according to one embodiment of the disclosure.

FIG. 6C is a perspective view of the debris protection seal having a spiral groove, according to one embodiment of the disclosure.

FIG. 10A is a sectional view of an embodiment of an alignment collar of FIG. 4E, according to one embodiment of the disclosure.

FIG. 10B is a partial perspective view of the alignment collar embodiment of FIG. 10A, according to one embodiment of the disclosure.

FIG. 10C is side elevational view of the alignment collar embodiment of FIG. 10A, according to one embodiment of the disclosure.

Figure 1:
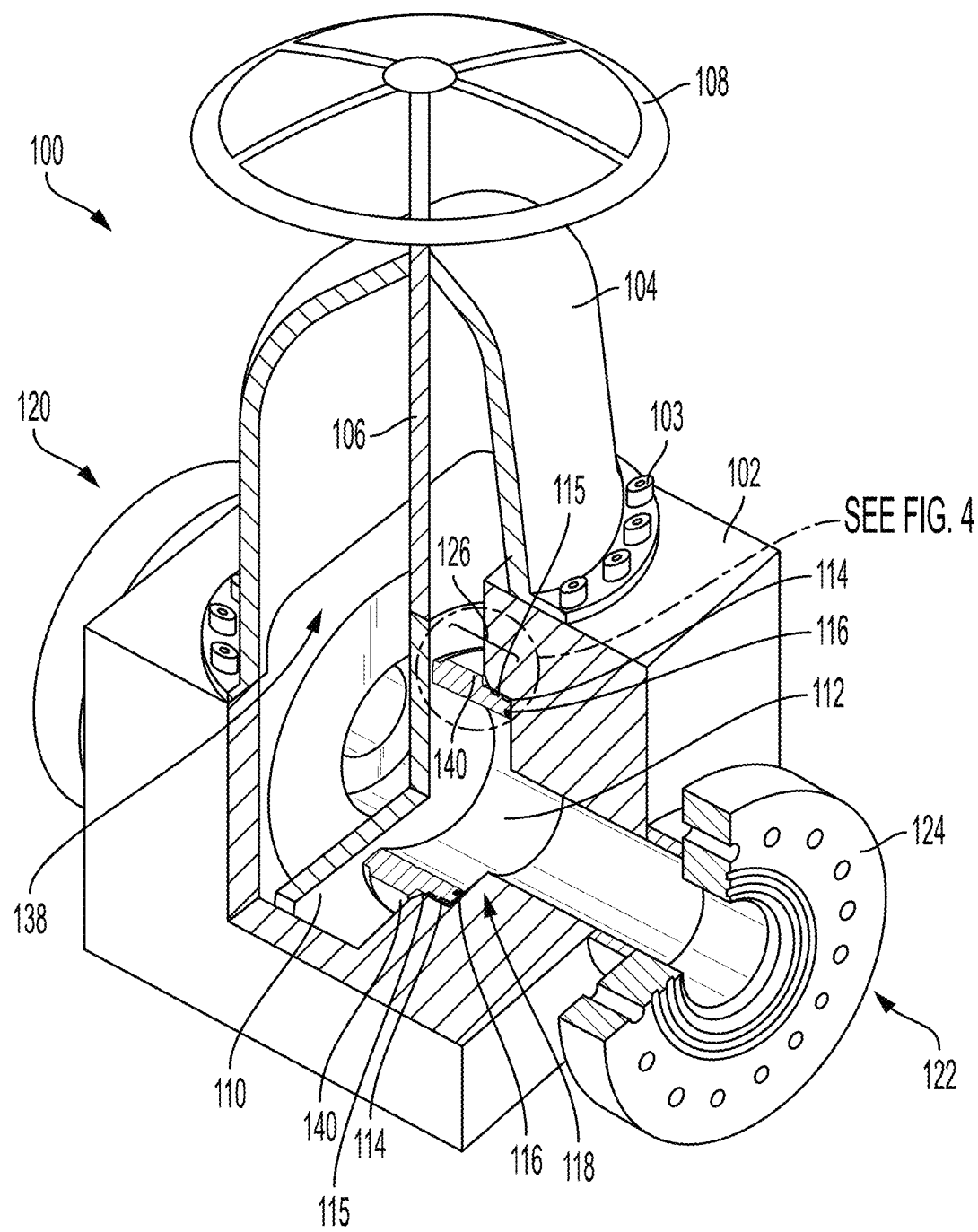
FIG. 1 is a perspective view of an embodiment of a gate valve having portions broken away for clarity, according to an embodiment of the disclosure.

To facilitate understanding, identical reference numerals have been used, where possible, to designate identical elements that are common to the figures. It is contemplated that elements and features of one embodiment may be beneficially incorporated into other embodiments without further recitation.

DETAILED DESCRIPTION

Gate valves have a wide variety of applications in many industries. Primarily, gate valves are used for isolation of process pipes or equipment. For example, gate valves may be utilized in specialized industries, such as food production, wastewater processing, and sewage handling for isolation of fluid transporting pipes or storage tanks. As gate valves feature full fluid flow within the valve with minimal disturbance to the fluid within by the gate and further may be relatively inexpensive compared to more complex solutions, gate valves are ideal valve solutions for oil and gas applications that routinely experience dirty fluids and harsh processing conditions. Thus, gate valves are heavily utilized and relied upon in oil and gas operations, such as hydraulic fracturing, oil production, chemical production, water treatment, or the like. However, exposure to these harsh and dirty conditions may require more frequent repairs or replacements of the gate valves. In particular, sediment in the fluid within the valve erodes or otherwise physically damages seals in gate valves that cause valve leaks.

Undesired sediment may be extracted from various oil and gas operations. For example, hydraulic fracturing is an oil and gas operation to extract trapped gases within underground formations that produces sediment. A hydraulic fluid may be injected into a well to break apart, or fracture, rock formations to release the trapped gases, such as methane. Additionally, in some scenarios, sand slurries may be pumped in the fractured rock formations to keep the rock formations from closing while allowing the gas to continue to flow through the sand. The extracted gas may be at high pressure and temperatures and may further possess sediment from the sand slurry or other underground debris. In another example, oil production sites, such as from deep sea reservoirs or onshore oil wells, tap into underground formations that are pressurized by centuries, or longer, creations of trapped gases. Once tapped, the underground formation expels high pressure and high temperature mixtures of oil, water, sand, and gas. The extracted fluid mixture possesses sediment from drilling operations, sand within the underground formations, or the like.

The present disclosure describes various embodiments related to a gate valve and methods for increased gate valve performance and service life by significantly reducing particles from damaging gate valve seals, such as a seat pressure seal. Gate valves contain several components that are potential sources of valve leaks in dirty services, such as, the aforementioned oil and gas operations. The dirty services may contain a high number of particles that migrate between several adjoining valve components leading to valve failure, such as valve seizure or leaks. These problematic failures necessitate routine service and maintenance which increase operational costs or may lead to process downtime which reduces revenue and product.

Gate valve seats have been known to cause leaks as the associated seals may experience an invasion of granular particles to damage or significantly reduce a sealing power of the gate valve seats within the gate valve pockets or seize the valve which may necessitate a replacement valve. Conventionally, the grease utilized to lubricate the valve seat is known to saturate with captured granular particles near the seat seal area creating a stoppage of the valve or a failed seat seal. Efforts have been implemented to reduce the amount of grease necessary for proper valve operation while maintaining proper sealing. However, the implementation of conventional seals has not achieved the desired longevity of the valve and, thus, frequent grease replacement is required for continued operation. As such, the present disclosure enhances valve operating performance and service life by reducing particle migration to the valve seat pressure seal.

The description may use the phrases "in certain embodiments," "in various embodiments," "in an embodiment," "in one embodiment, or "in example," which may each refer to one or more of the same or different embodiment. Furthermore, the terms "comprising," "including," "having," and the like, as used with respect to embodiments of the present disclosure, are synonymous. The term "plurality" as used herein refers to two or more items or components. The terms "about" or "approximately" are defined as being close to as understood by one of ordinary skill in the art. In one non-limiting example, these terms are defined to be within 10%, preferably within 5%, more preferably within 1%, and most preferably within 0.5%.

The terms "removing," "removed," "reducing," "reduced," or any variation thereof, when used in the claims or the specification includes any measurable decrease of one or more components in a mixture to achieve a desired result. The use of the words "a" or "an" when used in conjunction with any of the terms "comprising," "including," "containing," or "having," in the claims or the specification may mean "one," but it is also consistent with the meaning of "one or more," "at least one," and "one or more than one." The terms "wt. %", "vol. %", or "mol. %" refers to a weight, volume, or molar percentage of a component, respectively, based on the total weight, the total volume of material, or total moles, which includes the component. In a non-limiting example, 10 grams of a component in 100 grams of the material is 10 wt. % of the component.

FIG. 1 is a perspective view of an embodiment of a gate valve 100 having portions broken away for clarity, according to an embodiment of the disclosure. The gate valve 100 includes a seat assembly 126 discussed below. The depicted gate valve 100 includes a valve body 102 connected and fastened to a valve bonnet 104 with bolts 103, thereby defining a gate cavity 138, and further connected to a flange 124. The valve bonnet 104 may be fastened to the valve body 102 in a variety of manners, such as, but not limited to, a threaded connection, a stud and nut connection, a weld, a pressure seal, or other like connections. The valve body 102 may include multiple flanges 124 to fluidly connect the gate valve 100 to a network of pipes (not shown) configured to flow a fluid through the gate valve 100, as will be understood by those skilled in the art. In one embodiment, the flange 124 may include a compression flange, a threaded or a welded connection, or the like, to fluidly connect to adjacent pipes (not shown). The valve bonnet 104 houses a valve stem 106 that connects a handwheel 108 to a gate 110 disposed in the gate cavity 138. The gate cavity 138 may be a wet area that routinely contacts a valve fluid and houses the gate 110. In embodiments, the valve stem 106 may be a rising or a non-rising stem type, for example, as will be understood by those skilled in the art. While the gate valve 100 is illustrated as a manually operated gate valve 100 by handwheel 108, it is contemplated a mechanical, electrical, or pneumatic actuator (not shown) may be used in place of, or in addition to, the handwheel 108, thereby to rotate the valve stem 106 to stroke, or actuate the movement of, the gate 110 towards an open or closed position initiated from a location site away from the valve, such as an operator station, or a control panel.

As illustrated, the gate 110 is configured to abut a valve seat 112 and compress a first seat pressure seal 114, position a second seat pressure seal 115, and compress a debris protection seal 116, each disposed on the valve seat 112 into a seat recess 118 defined into the valve body 102. The compression of the first seat pressure seal 114 enables the first seat pressure seal 114 to sealingly expand to seal against surfaces, and the positioning of the second seat pressure seal 115 allows the valve seat 112 to redundantly seal against the seat recess 118 to prevent leaks from an upstream end 120, through the gate 110 and bypassing the first seat pressure seal 114, and into a downstream end 122. In one embodiment, the valve may be bi-directional fluid flowing, and the upstream end 120 and the downstream end 122 may be positioned opposite facing as illustrated in FIG. 1. The gate 110 may be a solid taper wedge, a split wedge, a flexible wedge type, or the like, as will be understood by those skilled in the art. Furthermore, the gate valve 100 may be a wafer gate, a spring-loaded valve, a ball gate valve, a diaphragm gate valve, a swing gate valve, or the like, as will be understood by those skilled in the art. Each of the first seat pressure seal 114, the second seat pressure seal 115, and the debris protection seal 116 will be discussed in further detail below, along with alternative embodiments. Several minor operational components, such as, packing glands, bushings, a yoke, guides, bearings, and the like, as will be understood by those skilled in the art, are excluded from the drawings and not described further herein but may be incorporated in an embodiment of a gate valve 100.

Figures 2A, 2B:
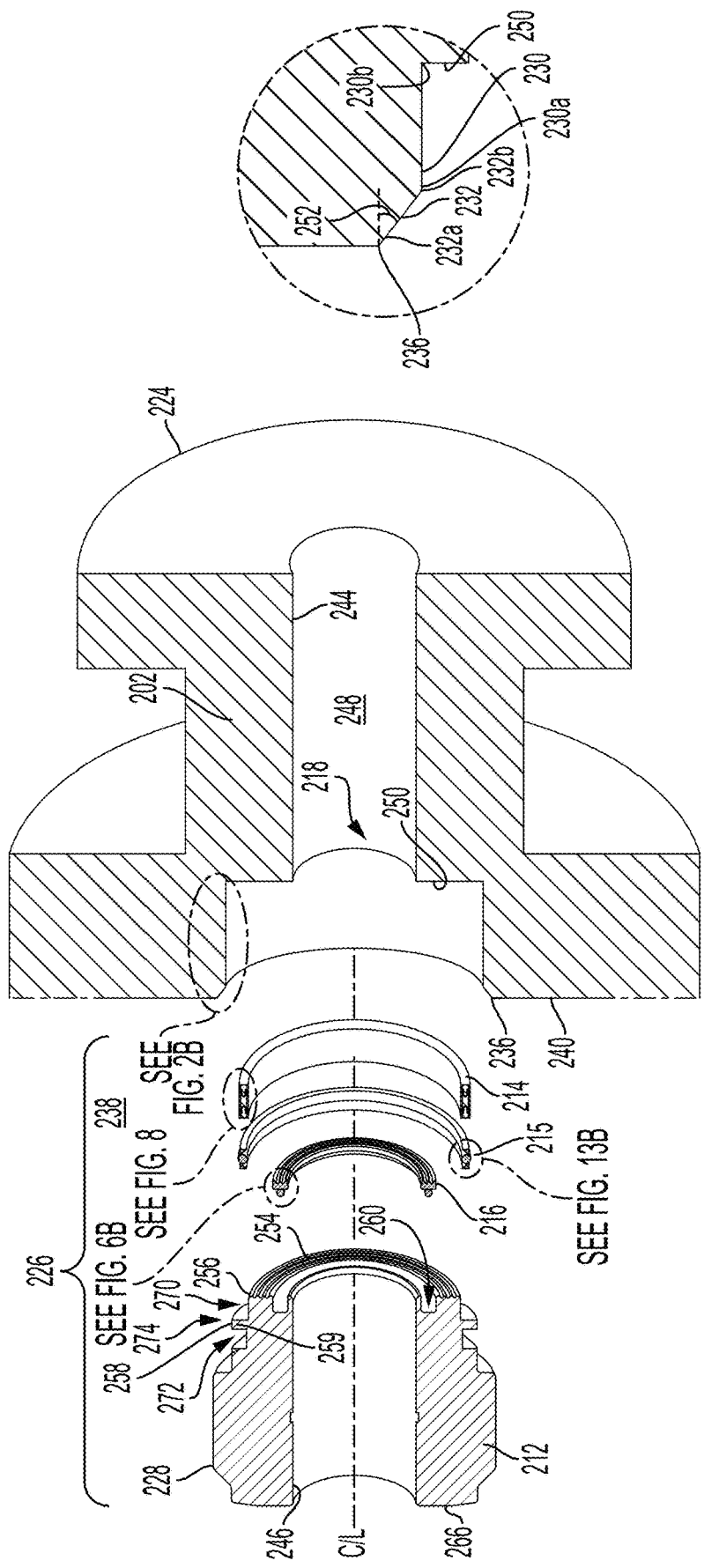
FIG. 2A is an exploded sectional view of a gate valve body having a seat assembly, in a full-bore embodiment of the disclosure, according to an embodiment of the disclosure.
FIG. 2B is an enlarged view of a valve body seat profile taken along the lines FIG. 2B of the gate valve body of FIG. 2A, according to an embodiment of the disclosure.

FIG. 2A is an exploded sectional view of a gate valve body having a seat assembly 226, in a full-bore embodiment of the disclosure, according to one embodiment of the present disclosure. FIG. 2B is an enlarged view of a valve body seat profile taken along the lines FIG. 2B of the gate valve body of FIG. 2A. The following will disclose physical relationships for components of the gate valve 100. It is to be understood the central reference point for the terms "distal" and "proximate" is the gate 110. The gate valve body 202 illustrates an example of a half of the valve body 202 with a throughbore 248 having an inner diameter 244 that substantially matches an inner diameter surface 246 of the annular valve seat 212, commonly known as a full-bore. It is contemplated a reduced bore gate valve may also implement the gate valve embodiment disclosed herein, as will be understood by those skilled in the art. Further, it is to be understood that the half of a gate valve body 202 illustrated may be the upstream end 120 or the downstream end 122 as shown in FIG. 1. While the gate valve body 202 is illustrated to be a globe shape, the valve body 202 may be a cube shape, as the valve body 102 shown in FIG. 1, a cylindrical shape, or other customary shapes known and understood by those skilled in the art to be a gate valve and associated gate valve body.

The valve body 202 includes the flange 224 and the seat recess 218. The seat recess 218 is configured to tightly receive a second outer diameter surface 258 of the valve seat 212 to position the valve seat 212 therein. The seat recess 218 includes a distal radial wall 250, a first radial recess wall 230, and a second radial recess wall 232 with a lip 236 connected to a radial cavity wall 240 of an adjacent gate cavity 238. In one embodiment, the first radial recess wall 230 defines a bore in the valve body 202, and the second radial recess wall 232 defines a tapering portion positioned to extend from the first radial recess wall 230 to the gate cavity 238. The first radial recess wall 230 has a first end 230a and a second end 230b positioned on the proximate and distal portions, respectively, of the bore defined by the first radial recess wall 230. The second end 230b of the first radial recess wall 230 is connected to the throughbore 248 by the distal radial wall 250. In one embodiment, the distal radial wall 250 has a plane that is substantially radially disposed to a Center Line ("C/L"). The first end 230a of the first radial recess wall 230 is connected to a second end 232b of the second radial recess wall 232. The second radial recess wall 232 has a first end 232a and a second end 232b. The first end 232a is connected to the lip 236 that directly connects the radial cavity wall 240 of a gate cavity 238 to the second radial recess wall 232. The gate cavity 238 is configured to receive any internal components of the gate valve 100, such as, for example, the gate 110, and may be a bore, transversely positioned to and fluidly connected to the throughbore 248. In one embodiment, the bore may be a cross-bore, a y-bore, or other type bores commonly used in the valve industry.

The first radial recess wall 230 is substantially parallel to, and further has a diameter greater than, the inner diameter 244 of the throughbore 248. The second radial recess wall 232 is disposed between and links the first radial recess wall 230 and gate cavity 238 at a slope. The slope has an angle 252 that is about 15 degrees to about 45 degrees, such as about 25 degrees to about 35 degrees, such as about 30 degrees. The angle 252 is advantageous as the second outer diameter surface 258 of the valve seat 212 is guided by the angle 252 to insert the tight fitting valve seat 212 within the seat recess 218 with minimal damage to the lip 236, a known failure point for leaks on conventional valves, and with minimal damage to an outer edge 256 on a distal surface 254 of the valve seat 212, a known particle ingress location causing damage to the seat pressure seal 214. Stated differently, conventional valves experience damage at multiple connection sites between a gate cavity and a throughbore by improper installation, for example, entry of the valve seat within a seat recess. By the addition of the profile described above for the seat recess 218 to the valve body 202, the valve seat 212 is guided by the angle 252 to properly install the tight fitting second outer diameter surface 258 of the valve seat 212 into contact with the first radial recess wall 230 with significantly reduced damage to known failure points of conventional valves. Therefore, the angle 252 significantly reduces installation error as precisely cut components, such as the valve seat 212 and the seat recess 218, are integrated with increased confidence of reduced damage.

The seat assembly 226 includes the valve seat 212, a debris protection seal 216, the seat pressure seal 214, and a second seat pressure seal 215. The seat assembly 226 may be available in a replacement kit available for replacement of damaged seats and seals. In one embodiment, the second outer diameter surface 258 that has a diameter slightly less than the first radial recess wall 230 to enable a tight fit of the seat 212 within the seat recess 218. The second outer diameter surface 258 may be projected from the seat 212 to define a radial projection 274 that straddles a first pocket 270 and a second pocket 272 of the seat 212. The structure of the valve seat 212 will be discussed in further detail below. The first pocket 270 is configured to receive the seat pressure seal 214 thereon and abut against a shoulder 259. The second pocket 272 is configured to receive the second seat pressure seal 215 thereon. In one embodiment, the seat pressure seal 214 is an annular seal including multiple sealing members, discussed below. Similarly, the second seat pressure seal 215 is an annular seal including sealing members and retaining members, discussed below. In one embodiment, the seat pressure seal 214, or the second seat pressure seal 215 may include a single sealing member, such as an O-ring type seal with various cross-sectional shapes, as will be understood by those skilled in the art, thereby to allow for custom sealing for different operating conditions, such as high pressure or high temperature operations. The debris protection seal 216 is configured to fit within a seal recess 260 on the distal surface 254 of the valve seat 212. Further, the debris protection seal 216 is configured to reduce the number of particles, such as sediment or sand within the valve fluid, to ingress toward the seat pressure seal 214, or the second seat pressure seal 215, discussed in more detail below.

FIG. 2C is a sectional view of an integrated gate valve body 202 with a valve seat 212, including a debris protection seal 216, positioned within the seat recess 218, according to an embodiment of the disclosure. Stated differently, the valve seat 212 may be positioned in the bore defined by the first radial recess wall 230 of the valve body 202. FIG. 2D is an enlarged view of the valve body seat profile including the seat installation taken along the lines of FIG. 2D of the gate valve body of FIG. 2C. The valve seat 212 is tightly positioned within the seat recess 218 such that the distal surface 254 of the valve seat 212 abuts the distal radial wall 250 of the seat recess 218, thereby to establish a metal-to-metal contact to reduce particle infiltration from the fluid within the throughbore 248 to the seat pressure seal 214, or the second seat pressure seal 215, according to one embodiment. The valve body 202 includes stainless steel, such as 316, 316L, 304, 304L, or super duplex stainless steel. In one embodiment, the valve seats 212, includes stainless steel, such as 316, 316L, 304, 304L, or super duplex stainless steel.

The unification of the valve seat 212 into the seat recess 218, as illustrated from the positions in FIG. 2A to the integrated positions in FIG. 2C, creates an air flow as a volume of air is displaced between the distal surface 254 of the valve seat 212 and the distal radial wall 250 of the seat recess 218. For example, as the valve seat 212 is placed and slid into the seat recess 218, the seat pressure seal 214, having a slightly greater radial thickness 262 as compared to the second outer diameter surface 258, pushes air flow towards the throughbore 248. Similarly, second seat pressure seal 215 may have a slightly greater radial thickness 262 as compared to the second outer diameter surface 258, in one embodiment. Prior to contact between the distal surface 254 and the distal radial wall 250, the debris protection seal 216 contacts with the distal radial wall 250 but nonetheless allows the escape the air flow to enable full contact with the distal radial wall 250, therefore eliminating a risk of an air pocket disposed between the seat pressure seal 214, distal surface 254, the distal radial wall 250, and the debris protection seal 216, in one embodiment.

Conventional designs may be plagued with trapped air pockets upon installation within the same boundaries as mentioned above. These air pockets have been problematic as retraction of the valve seat to remove the valve seat from the seat recess creates a suction at the site of the air pocket, thus making the removal challenging. Furthermore, air pockets hinder a desired metal-to-metal contact between the distal surface 254 and the distal radial wall 250. In more extreme scenarios, a trapped air pocket may cavitate under pressure exerted onto the valve seat from a gate, such as the gate 110 of FIG. 1, causing damage to the valve body or the valve seat and, therefore, an increased risk of leaks, repairs, or replacements that increase the cost of operation and lost production. To overcome this challenge, the debris protection seal 216 advantageously allows air pockets to escape into the throughbore 248. In one embodiment, as further described below, the debris protection seal 216 has a spiral groove which enables the escape of air to force residual debris into the throughbore 248 during installation while simultaneously enabling case of retraction to remove the valve seat 212 from the seat recess 218. The spiral groove of the debris protection seal 216 further has operational advantages discussed further below.

In one embodiment, during operation, the air pocket, as discussed above, may be purged into the throughbore 248 because of a gate, such as gate 110 of FIG. 1, pushing the valve seat 212 in a direction 261, creating an axial force on the valve seat 212. The pushing the valve seat 212 in the direction 261 may exert an even axial force across the valve seat 212 which will allow any retained air pocket to purge through the debris protection seal 216 and into the throughbore 248, thereby allowing the desired metal-to-metal contact between distal surface 254 and the distal radial wall 250 to significantly seal the valve seat 212 to the valve body 202 to prevent leaks or bypassed fluids to bypass the gate 110.

The valve body 202 includes valve dimensions discussed below in reference to a 7.08+/−0.005-inch bore, full bore gate valve. In one embodiment, the valve bore dimensions may range from 1.813+/−0.001 inch bore to about 7.1-inch bore, full bore gate valves. It is contemplated the dimensions and their associated ratios disclosed may be utilized to scale embodiments of a gate valve to varied sizes that would be appropriate for each operating scenario under various fluid services, as will be understood by those skilled in the art. In one embodiment, for example, the first radial recess wall 230 has a length less than about 1.45 inches. In a further embodiment, for example, the first radial recess wall 230 has a diameter of about 9.410+/−0.006, such as about 9.410+/−0.004 inch, such as about 9.410+/−0.002 inch. In yet another embodiment, for example, the distal radial walls 250 of each of the seat recess 218 are spaced apart at a length 264 of about 14.129+/−0.005 inch, such as about 14.129+/−0.003 inch, such as about 14.129+/−0.001 inch. In an embodiment, the intersection of the first radial recess wall 230 and the second radial recess wall 232, at either the first end 230a of the first radial recess wall 230 or the second end 232b of the second radial recess wall 232, may be machined to have a radius of curvature of about 0.25 inch. In one embodiment, when installed, the valve seats 212 may be separated by a length 268 of less than about 7 inches, such as less than about 6 inches, such less than about 5.5 inches, to accommodate and contact a gate 110.

FIG. 3A is an exploded sectional view of a gate valve body having a seat assembly 326, in a full-bore embodiment of the disclosure, according to another embodiment of the present disclosure. FIG. 3B is an enlarged view of a valve body seat profile taken along the lines FIG. 3B of the gate valve body of FIG. 3A. The following will disclose physical relationships for components of the gate valve 100 using an alternative example of a valve seat, such as valve seat 312. It is to be understood the central reference point for the terms "distal" and "proximate" is the gate 110. The gate valve body 302 illustrates an example of a half of the valve body 302 with a throughbore 348 having an inner diameter 344 that substantially matches an inner diameter surface 346 of the annular valve seat 312, commonly known as a full-bore. It is contemplated a reduced bore gate valve may also implement the gate valve embodiment disclosed herein, as will be understood by those skilled in the art. Further, it is to be understood that the half of a gate valve body 302 illustrated may be the upstream end 120 or the downstream end 122 as shown in FIG. 1. While the gate valve body 302 is illustrated to be a globe shape, the valve body 302 may be a cube shape, as the valve body 102 shown in FIG. 1, a cylindrical shape, or other customary shapes known and understood by those skilled in the art to be a gate valve and associated gate valve body.

The valve body 302 includes the flange 324 and the seat recess 318. The seat recess 318 is configured to tightly receive a second outer diameter surface 358 of the valve seat 312 to position the valve seat 312 therein. The seat recess 318 includes a distal radial wall 350, a first radial recess wall 330, and a second radial recess wall 332 with a lip 336 connected to a radial cavity wall 340 of an adjacent gate cavity 338. In one embodiment, the first radial recess wall 330 defines a bore in the valve body 302, and the second radial recess wall 332 defines a tapering portion positioned to extend from the first radial recess wall 330 to the gate cavity 338. The first radial recess wall 330 has a first end 330a and a second end 330b positioned on the proximate and distal portions, respectively, of the bore defined by the first radial recess wall 330. The second end 330b of the first radial recess wall 330 is connected to the throughbore 348 by the distal radial wall 350. In one embodiment, the distal radial wall 350 has a plane that is substantially radially disposed to a C/L. The first end 330a of the first radial recess wall 330 is connected to a second end 332b of the second radial recess wall 332. The second radial recess wall 332 has a first end 332a and a second end 332b. The first end 332a is connected to the lip 336 that directly connects the radial cavity wall 340 of a gate cavity 338 to the second radial recess wall 332. The gate cavity 338 is configured to receive any internal components of the gate valve 100, such as, for example, the gate 110, and may be a bore, transversely positioned to and fluidly connected to the throughbore 348. In one embodiment, the bore may be a cross-bore, a y-bore, or other type bores commonly used in the valve industry.

The first radial recess wall 330 is substantially parallel to, and further has a diameter greater than, the inner diameter 344 of the throughbore 348. The second radial recess wall 332 is disposed between and links the first radial recess wall 330 and gate cavity 338 at a slope. The slope has an angle 352 that is about 5 degrees to about 35 degrees, such as about 15 degrees to about 25 degrees, such as about 20 degrees. The angle 352 is advantageous as the second outer diameter surface 358 of the valve seat 312 is guided by the angle 352 to insert the tight fitting valve seat 312 within the seat recess 318 with minimal damage to the lip 336, a known failure point for leaks on conventional valves, and with minimal damage to an outer edge 356 on a distal surface 354 of the valve seat 312, a known particle ingress location causing damage to the seat pressure seal 314. Stated differently, conventional valves experience damage at multiple connection sites between a gate cavity and a throughbore by improper installation, for example, entry of the valve seat within a seat recess. By the addition of the profile described above for the seat recess 318 to the valve body 302, the valve seat 312 is guided by the angle 352 to properly install the tight fitting second outer diameter surface 358 of the valve seat 312 into contact with the first radial recess wall 330 with significantly reduced damage to known failure points of conventional valves. Therefore, the angle 352 significantly reduces installation error as precisely cut components, such as the valve seat 312 and the seat recess 318, are integrated with increased confidence of reduced damage.

The seat assembly 326 includes the valve seat 312, a debris protection seal 316, and a seat pressure seal 314. The seat assembly 326 may be available in a replacement kit available for replacement of damaged seats and seals. In one embodiment, the second outer diameter surface 358 that has a diameter slightly less than the first radial recess wall 330 to enable a tight fit of the seat 312 within the seat recess 318. Adjacent to the second outer diameter surface 358 is a pocket 370. The pocket 370 is configured to receive the seat pressure seal 314 thereon and abut against a shoulder 359. In one embodiment, the seat pressure seal 314 is an annular seal including multiple sealing members, discussed below. In one embodiment, the seat pressure seal 314 may include a single sealing member, such as an O-ring type seal with various cross-sectional shapes, as will be understood by those skilled in the art, thereby to allow for custom sealing for different operating conditions, such as high pressure or high temperature operations. The debris protection seal 316 is configured to fit within a seal recess 360 on the distal surface 354 of the valve seat 312. Further, the debris protection seal 316 is configured to reduce the number of particles, such as sediment or sand within the valve fluid, to ingress toward the seat pressure seal 314, or the second seat pressure seal 315, discussed in more detail below.

FIG. 3C is a sectional view of an integrated gate valve body 302 with a valve seat 312, including a debris protection seal 316, positioned within the seat recess 318, according to an embodiment of the disclosure. Stated differently, the valve seat 312 may be positioned in the bore defined by the first radial recess wall 330 of the valve body 302. FIG. 3D is an enlarged view of the valve body seat profile including the seat installation taken along the lines of FIG. 3D of the gate valve body of FIG. 3C. The valve seat 312 is tightly positioned within the seat recess 318 such that the distal surface 354 of the valve seat 312 abuts the distal radial wall 350 of the seat recess 318, thereby to establish a metal-to-metal contact to reduce particle infiltration from the fluid within the throughbore 348 to the seat pressure seal 314. The valve body 302 includes stainless steel, such as 316, 316L, 304, 304L, or super duplex stainless steel. In one embodiment, the valve seats 312, includes stainless steel, such as 316, 316L, 304, 304L, or super duplex stainless steel.

Similar to the embodiment of FIG. 2A-2D, the debris protection seal 316 advantageously allows air pockets to escape into the throughbore 348. In one embodiment, as further described below, the debris protection seal 316 has a spiral groove which enables the escape of air to force residual debris into the throughbore 348 during installation while simultaneously enabling case of retraction to remove the valve seat 312 from the seat recess 318. To provide clarity, the debris protection seal 316 operates and may be substantially similar, if not the same, as the debris protection seal 216 of FIGS. 1-2D.

In another embodiment, during operation, the air pocket, as discussed above in FIG. 2A-2D, may be purged into the throughbore 348 because of a gate, such as gate 110 of FIG. 1, pushing the valve seat 312 in a direction 361, creating an axial force on the valve seat 312. The pushing the valve seat 312 in the direction 361 may exert an even axial force across the valve seat 312 which will allow any retained air pocket to purge through the debris protection seal 316 and into the throughbore 348, thereby allowing the desired metal-to-metal contact between distal surface 354 and the distal radial wall 350 to significantly seal the valve seat 312 to the valve body 302 to prevent leaks or bypassed fluids to bypass the gate 110.

The valve body 302 includes valve dimensions discussed below in reference to a 7.08+/−0.002-inch bore, full bore gate valve. In one embodiment, the valve bore dimensions may range from 1.813+/−0.001 inch bore to 10.694+/−0.001-inch bore, full bore gate valves. It is contemplated the dimensions and their associated ratios disclosed may be utilized to scale embodiments of a gate valve to varied sizes that would be appropriate for each operating scenario under various fluid services, as will be understood by those skilled in the art. In one embodiment, for example, the first radial recess wall 330 has a length of about 0.423+/−0.005 inch. In a further embodiment, for example, the first radial recess wall 330 has a diameter of about 10.700+/−0.005. In yet another embodiment, for example, the distal radial walls 350 of each of the seat recess 318 are spaced apart at a length 364 of about 12.536+/−0.002 inch. In still another embodiment, the first radial recess wall 330 may be machined finished to have a roughness average ("Ra") of about 32 Ra. In an embodiment, for example, the distal radial wall 350 of the seat recess 318 may be machined, as will be understood by those skilled in the art, and finished to have a roughness average of about 32 Ra. In an embodiment, the intersection of the first radial recess wall 330 and the second radial recess wall 332, at either the first end 330a of the first radial recess wall 330 or the second end 332b of the second radial recess wall 332, may be machined to have a radius of curvature of about 0.063 inch. In one embodiment, when installed, the valve seats 312 may be separated by a length 368 of less than about 5 inches, such as less than about 4.9 inches, such as about 4.76 inches, to accommodate and contact a gate 110.

Figure 4A:
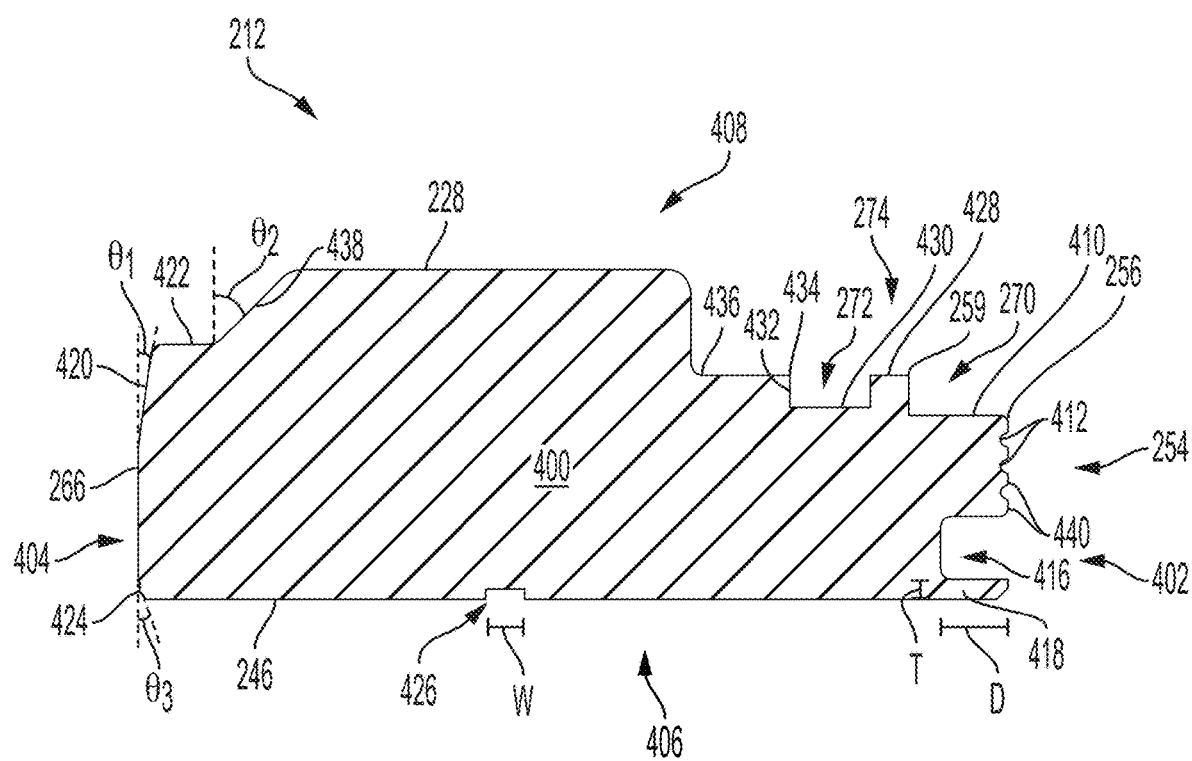
FIG. 4A is a sectional view of a gate valve seat without seals thereon taken along the lines of FIG. 4A of the sectional view of FIG. 2C, according to an embodiment of the disclosure.

Referring back to the valve seat embodiment of FIGS. 1-2D, FIG. 4A is a sectional view of a gate valve seat 212 without seals thereon taken along the lines of FIG. 4A of the sectional view of FIG. 2C, according to an embodiment of the disclosure. FIGS. 4B-4E are sectional views of a gate valve seat 212 of FIG. 4A with alternative embodiments of seals positioned thereon. The valve seat 212, as illustrated in FIG. 4A, has an annular body 400 defined by a distal end 402, a proximal end 404, an inner diameter end 406, and an outer diameter end 408. The distal end 402 is opposite the proximal end 404 and the inner diameter end 406 is opposite the outer diameter end 408. To be clear, the embodiment of the valve seat 212 and associated seals represented in FIGS. 4A-4E are related to the embodiments illustrated in FIGS. 2A-2D.

The distal end 402 has an outer edge 256 defined by a connection of a first outer diameter surface 410 and the distal surface 254 of the valve seat 212. The distal surface 254 extends from the outer edge 256 to the inner diameter surface 246 of the valve seat 212. The distal surface 254 may have a length of about 0.952 inches. Further, as illustrated, the distal surface 254 may have one or more debris cavities 412, a seal recess 416, and a ledge 418 defined by the seal recess 416 and a connection of the distal surface 254 and the inner diameter surface 246 of the valve seat 212.

The one or more debris cavities 412 may be straddled by one or more contact sites 440 and configured to abuttingly contact the distal radial wall 250 for the desired metal-to-metal contact during operation. In one embodiment, as illustrated, the one or more debris cavities 412 have three cavities that are equidistant from each other at a distance of about 0.13 inches apart. For example, a first of the one or more debris cavities 412 may be positioned at a distance of about 0.13 inches in a direction towards the inner diameter surface 246 from the first outer diameter surface 410. In another embodiment, each of the one or more debris cavities 412 are shaped as substantially half circles having a radius of about 0.063 inches into the distal surface 254 of the valve seat 212 such that a substantially flat portion (one or more contact sites 440) of the distal surface 254 straddle adjacent debris cavities. Stated differently, the one or more contact sites 440 are positioned between and around each of the one or more debris cavities 412. In operation, as the one or more contact sites 440 contact the distal radial wall 250, the one or more debris cavities 412 encapsulate debris that has bypassed the debris protection seal 216 to advantageously reduce the likelihood, or risk, of debris interference with the sealing power of with the first seat pressure seal 214 or second seat pressure seal 215. The seal recess 416 may be configured to house the debris protection seal 216 therein. The seal recess 416 may have a depth D of about 0.345+/−0.002 inches. The ledge 418 retains the debris protection seal 216 within the seal recess 416 to desirably position the debris protection seal 216 for contact with the distal radial wall 250 of the valve body 202. In some embodiments, the ledge 418 may have a radial thickness T of about 0.112 inches.

The proximal end 404 includes a proximal surface 266 that may be substantially perpendicular to the inner diameter surface 246 and extends from a first angled wall 420 to a second angled wall 424. The proximal surface 266 may have a length of about 0.795 inches. The first angled wall 420 may be connected to a sixth outer diameter surface 422 of the valve seat 212 and may have a slope $\Theta_1$ of about 10 degrees with a length of about 0.433 inches. The second angled wall 424 may be connected to the inner diameter surface 246 of the valve seat 212 and may have a slope $\Theta_3$ of about 20 degrees with a length of about 0.090 inches.

The inner diameter end 406 has the inner diameter surface 246 and a recess 426. The inner diameter surface 246 may have a diameter substantially similar to a diameter of the throughbore 248 and extends from the second angled wall 424 of the proximal end 404 to the ledge 418. The inner diameter surface 246 may have a diameter of about 7.080 inches and a length of about 4.500 inches. The inner diameter surface 246 further has a recess 426 to engage a retraction tool during maintenance. The recess 426 may be positioned at a distance of about 1.8 inches from the proximal surface 266 and have a radial depth of about 0.060 inches and a width W of about 0.200 inches.

The outer diameter end 408 has first outer diameter surface 410, a second outer diameter surface 428 on a radial projection 274, a third outer diameter surface 430, a fourth outer diameter surface 436, the fifth outer diameter surface 228, and the sixth outer diameter surface 422. The first outer diameter surface 410 and the radial projection 274 define the first pocket 270. The first pocket 270 may also be defined by the outer edge 256 and the radial projection 274. The first pocket 270 may be configured to position a first seat pressure seal, such as seat pressure seal 214 from FIGS. 2A, 2C, and 4B-4D, therein when installed. The first outer diameter surface 410 may have a length of about 0.517 inches. The radial projection 274 separates the first pocket 270 and a second pocket 272 and further has the second outer diameter surface 428 extending between the first pocket 270 and the second pocket 272. The second outer diameter surface 428 may have a length of about 0.200 inches. The radial projection 274 may extend a distance of about 0.21 inches from the first outer diameter surface 410. The second pocket 272 may be defined by the radial projection 274, a third outer diameter surface 430, and a radial wall 432 extending from the third outer diameter surface 430 to a shoulder 434 connecting a fourth outer diameter surface 436 to the radial wall 432. The third outer diameter surface 430 may have a length of about 0.412 inches. The radial wall 432 may have a radial height of about 0.167 inches. Thus, the second pocket 272 may be shallower as compared to the first pocket 270. The second pocket 272 may be configured to position a second seat pressure seal, as will be discussed below, therein when installed. The fourth outer diameter surface 436 may have a length of about 0.511 inches. The fifth outer diameter surface 228 may have an outer diameter of about 10.492+/−0.002 inches. The sixth outer diameter surface 422 may have a diameter of about 9.715 inches. Thus, the fifth outer diameter surface 228 has a diameter greater than the fourth outer diameter surface 436 or the sixth outer diameter surface 422. The third angled wall 438 may extend from the fifth outer diameter surface 228 to the sixth outer diameter surface 422 and may have a slope $\Theta_2$ of about 45 degrees.

The dimensions disclosed above for valve seat 212, advantageously allow the seat pressure seal 214 to slip onto the seat recess 218 with reduced or eliminated need for grease, allow for air pockets to exhaust into the throughbore 248 when the valve seat 212 moves, allow for redundant metal-to-metal contacts between the distal surface 254 and the distal radial wall 250, thereby to provide enhanced protection from leaks or valve failure and while providing an case of installation, and reduced particle migration toward the seat pressure seal 214, among other features described and discussed above.

Figure 4B:
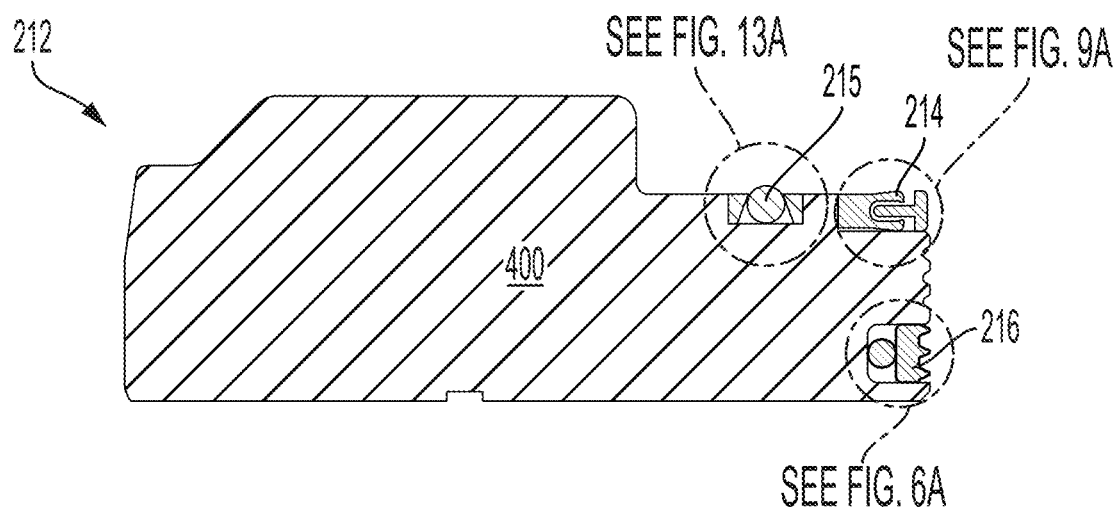
FIGS. 4B-4E are sectional views of a gate valve seat of FIG. 4A with alternative embodiments of seals positioned thereon, according to embodiments of the disclosure.

FIGS. 4B-4E illustrate various embodiments of seals contemplated to be positioned within the first pocket 270 and the second pocket 272 of the valve seat 212. For example, FIG. 4B illustrates a sectional view of the valve seat 212 with a first seat pressure seal 214, the second seat pressure seal 215, and the debris protection seal 216 positioned thereon to clarify seal positioning. The first seat pressure seal 214 includes a two component seal that will be discussed in detail in FIGS. 9A-9B. The second seat pressure seal 215 includes a three component seal that will be discussed in detail in FIGS. 13A and 13B. The debris protection seal 216 will be discussed in FIG. 6A-6C. The debris protection seal 216 is common to all embodiments illustrated on FIGS. 4B-4E.

Figure 4C:
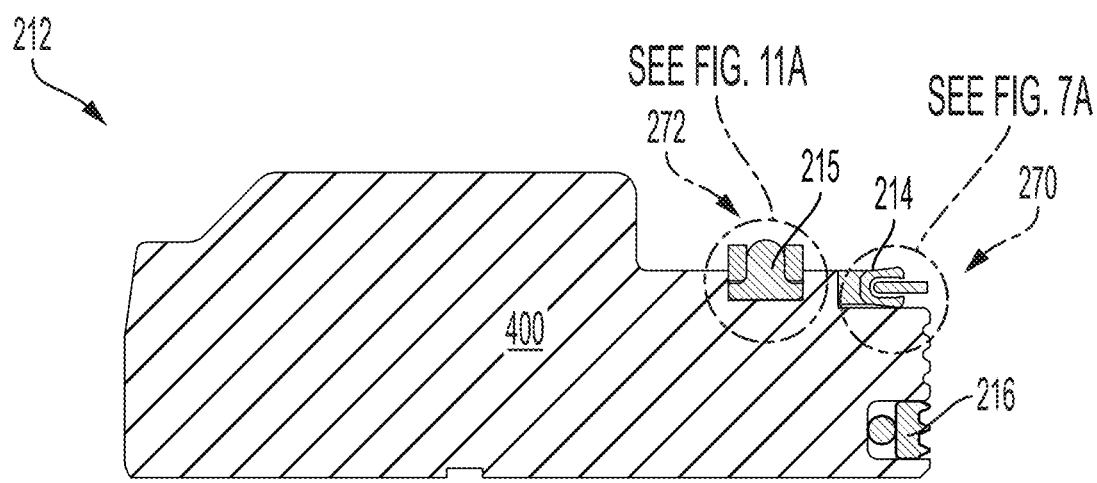
Figure 4D:
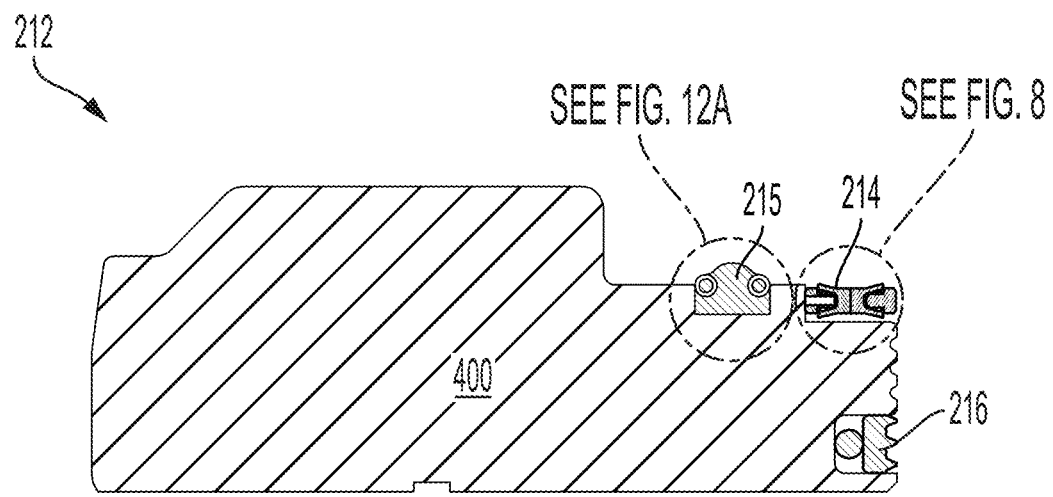
Figure 4E:
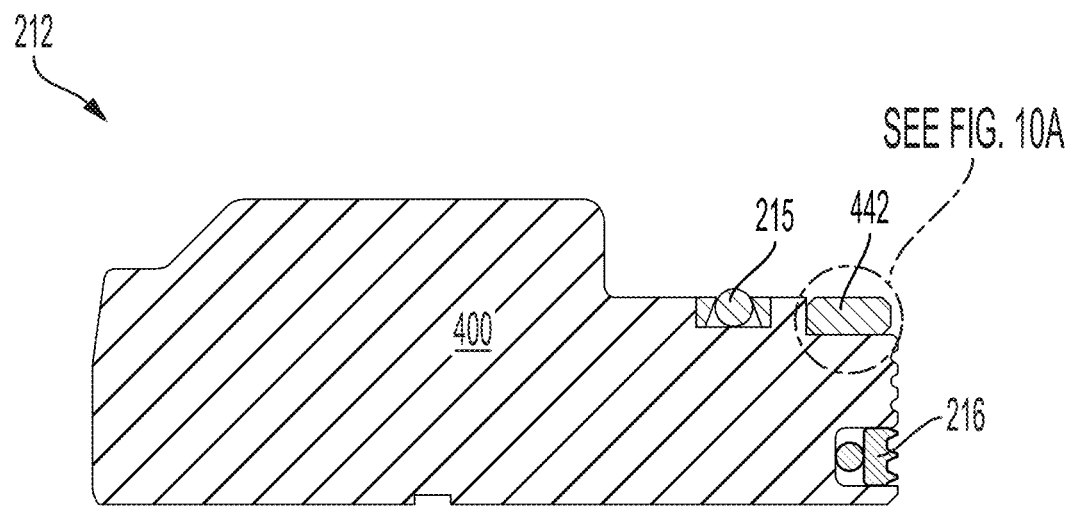

Other alternatives for the first seat pressure seal 214 include a three component seal illustrated in FIG. 4C within the first pocket 270, a four component seal illustrated in FIG. 4D within the first pocket 270, and an alignment collar 442 illustrated in FIG. 4E. Each of the aforementioned first seat pressure seal 214 alternatives, excluding the alignment collar 442, include a male portion, or component, engaged with a female portion, or component. The male and the female components may be in abutting contact such that an axial force, as exerted onto the valve seat 212 by a movement of the gate 110 in the direction 261 illustrated in FIG. 2, compresses the components axially together which causes a seal, by a radially expansion of the female components, between the valve seat 212 and the bore of the valve body, specifically, between the first outer diameter surface 410 of the valve seat 212 and the first radial recess wall 230 of the valve body. The seal created from the axial compression and radial expansion produces a sealing power of the seal to reduce leaks during fluid flow operations of the gate valve 100. Furthermore, to clarify common seal structures, each of the male and the female components have an annular body such that the male component of the seat pressure seal 214 is a male spreader ring and the female portion includes a female seal member having an opening configured to receive the first male spreader ring to sealingly abut the female seal member to the bore of the valve body and the valve seat.

The alignment collar 442 illustrated in FIG. 4E is an alternative to a seal, such as the first seat pressure seal 214, in the first pocket 270. The alignment collar 442 may be utilized to increase the lifespan of other seals positioned on the valve seat 212. For example, prolonged use of a valve seat within a gate valve may experience wear from mechanical movements and gravitational forces exerted onto the valve seat from the mechanical movements. These gravitational forces may wear the valve seat and seals due to unalignment within the seat recess 218. Stated differently, as seals wear, the valve seat weight may imbalance the sealing power of the seals which may lead to uneven sealing around the valve seat. The imbalance may be worsened by repetitive mechanical movements to cause failures from the mispositioned valve seat. The alignment collar 442 advantageously increases contacting surface area, between the first outer diameter surface 410 of the valve seat 212 and the first radial recess wall of the valve body, to provide a balanced position, or alignment, of the valve seat 212 within the bore, thereby to enhance and increase the lifespan of other seals present on the valve seat 212 through enabling substantially even sealing power between the valve seat and the bore from the other seals, thus reducing conventional wear.

Other alternatives for the second seat pressure seal 215 include a "t-seal" or an "s-seal", both would be understood by one skilled in the art. The t-seal is illustrated within the second pocket 272 of FIG. 4C and will be discussed in more detail in FIGS. 11A and 11B. The s-seal is illustrated within the second pocket 272 of FIG. 4D and will be discussed in FIGS. 12A and 12B. The three component seal, the t-seal, and the s-seal may be static type seals that provide constant sealing power due to clastic properties.

Figure 5A:
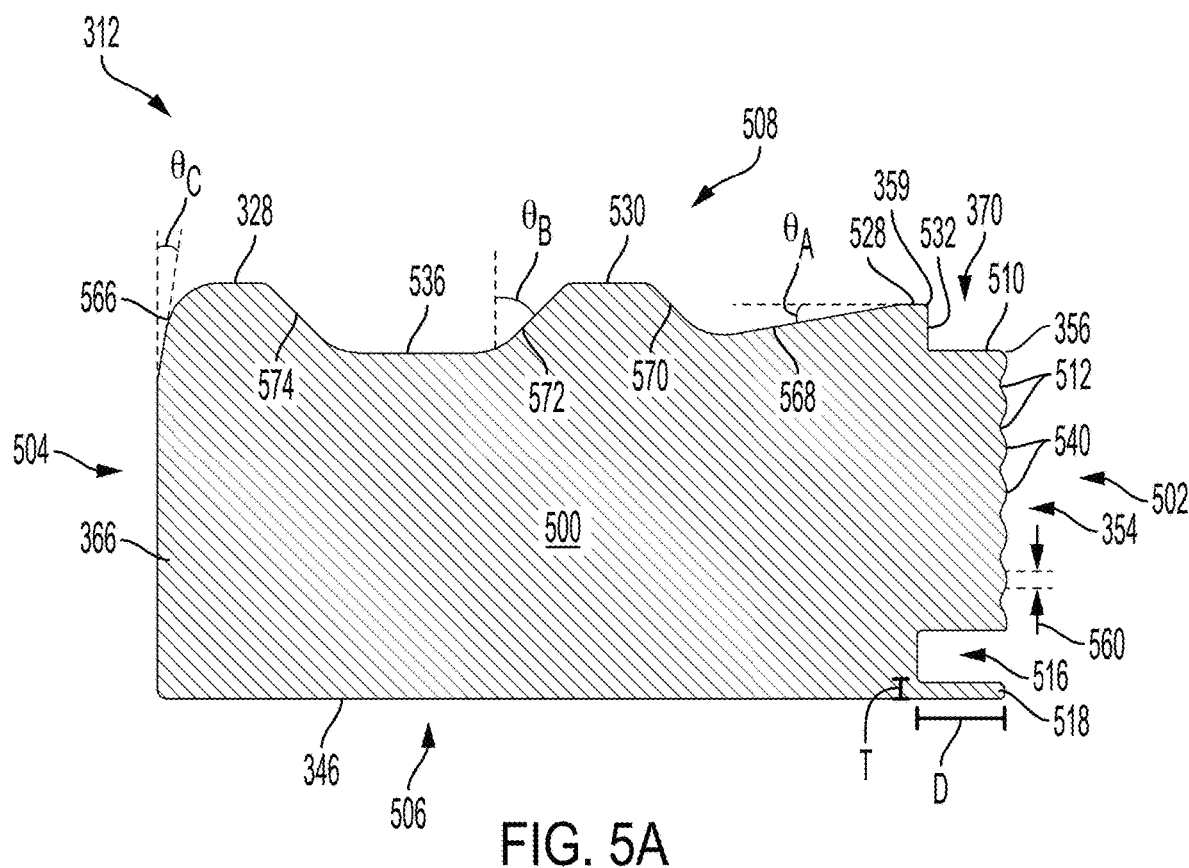
FIG. 5A is a sectional view of a gate valve seat without seals thereon taken along the lines of FIG. 5A of the sectional view of FIG. 3A, according to an embodiment of the disclosure.
Figure 5B:
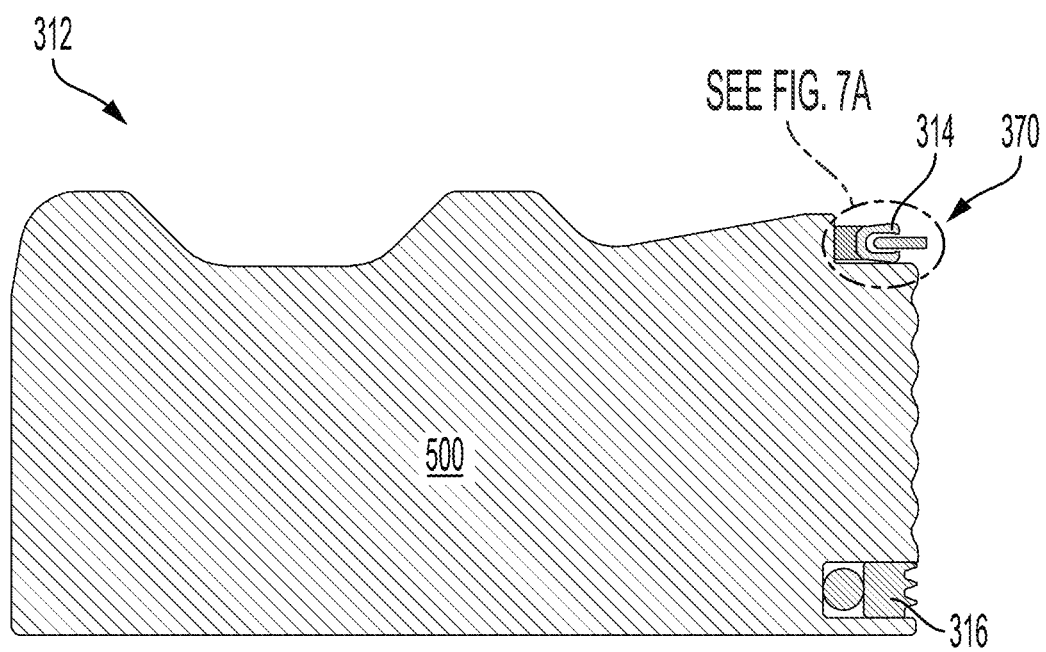
FIG. 5B is a sectional view of a gate valve seat of FIG. 5A, according to an embodiment of the disclosure.

Referring back to the valve seat embodiment of FIGS. 3A-3D, FIG. 5A is a sectional view of a gate valve seat 312 without seals thereon taken along the lines of FIG. 5A of the sectional view of FIG. 3A, according to an embodiment of the disclosure. FIG. 5B is a sectional view of a gate valve seat 312 of FIG. 5A with one embodiment of seals positioned thereon. The valve seat 312, as illustrated in FIG. 5A, has an annular body 500 defined by a distal end 502, a proximal end 504, an inner diameter end 506, and an outer diameter end 508. The distal end 502 is opposite the proximal end 504 and the inner diameter end 506 is opposite the outer diameter end 508. To be clear, the embodiment of the valve seat 312 and associated seals represented in FIGS. 5A and 5B are related to the embodiments illustrated in FIGS. 3A-3D.

The distal end 502 has an outer edge 356 defined by a connection of a first outer diameter surface 510 and the distal surface 354 of the valve seat 312. The distal surface 354 extends from the outer edge 356 to the inner diameter surface 346 of the valve seat 312. The distal surface 354 may have a length of about 1.597 inches. Further, as illustrated, the distal surface 354 may have one or more debris cavities 512, a seal recess 516, and a ledge 518 defined by the seal recess 516 and a connection of the distal surface 354 and the inner diameter surface 346 of the valve seat 312.

The one or more debris cavities 512 may be straddled by one or more contact sites 540 configured to abuttingly contact the distal radial wall 350 for the desired metal-to-metal contact during operation. In one embodiment, as illustrated, the one or more debris cavities 512 have about six cavities that are equidistant from each other at a distance of about 0.200 inches apart. In some embodiments, the one or more debris cavities 512 each have a radius of curvature of about 0.060 inches. In one embodiment, each of the one or more debris cavities 512 may be a concentric annular groove positioned within the distal surface 354 of the valve seat 312. The one or more contact sites 540 are positioned between and around each of the one or more debris cavities 512 and each may have a flat width 564 of about 0.200 inches. In operation, as the one or more contact sites 540 contact the distal radial wall 350, the one or more debris cavities 512 may encapsulate debris that has bypassed the debris protection seal 316 to advantageously reduce the likelihood, or risk, of debris interference with the sealing power of with the first seat pressure seal 314. In another embodiment, each of the one or more debris cavities 512 may be connected to produce a spiral groove pattern to elongate debris trajectory to reduce debris migration towards the seals, as mentioned above.

The seal recess 516 may be configured to house the debris protection seal 316 therein. The seal recess 516 may have a depth D of about 0.407+/−0.002 inches referenced from the distal surface 354. The ledge 518 retains the debris protection seal 316 within the seal recess 516. In some embodiments, the ledge 518 may have a radial thickness T of about 0.075 inches. In still another embodiment, the ledge 518 extends towards the distal surface 354 but does not cross the plane of the distal surface 354. In that example, the ledge 518 has a length of about 0.392 inches and is spaced from the distal surface 354 by a length of about 0.015 inches, to allow for air displacement, as discussed above in reference to air pockets.

The proximal end 504 includes a proximal surface 366 that may be substantially perpendicular to the inner diameter surface 346 and extends from a curved wall 566 to the inner diameter surface 346. The proximal surface 366 may have a length of about 1.460 inches. The curved wall 566 may be connected to a fifth outer diameter surface 328 of the valve seat 312 and may have a slope $\Theta_c$ of about 10 degrees.

The inner diameter end 506 has the inner diameter surface 346 with a diameter substantially similar to a diameter of the throughbore 348. The inner diameter surface 346 extends from the proximal surface 366 to the distal surface 354. The inner diameter surface 346 may have a diameter of about 7.080 inches and a length of about 3.889 inches.

The outer diameter end 508 has first outer diameter surface 510 connected to a second outer diameter surface 528 via a radial wall 532 to define the pocket 370, a first angled wall 568 connected to the second outer diameter surface 528 and a second angled wall 570, a third outer diameter surface 530 connected the second angled wall 570, a fourth outer diameter surface 536 connected to the third outer diameter surface 530 via a third angled wall 572, the fifth outer diameter surface 328 connected to the fourth outer diameter surface 536 via a fourth angled wall 574, and the curved wall 566 connecting the fifth outer diameter surface 328 and the proximal end 504. The first outer diameter surface 510 may have a length of about 0.359 inches with a diameter of about 10.273 inches. The pocket 370 may be also defined by the outer edge 356 and a connection between the first outer diameter surface 510 and a second outer diameter surface 528, e.g., the radial projection of the radial wall 532. The connection of the first angled wall 568 and the second angled wall 570 may referred to as the seat profile to designate the connection between the second outer diameter surface 528 and the third outer diameter surface 530. The seat profile may have a minimum diameter less than the diameter of the second outer diameter surface 528. The radial wall 532 may have a radial height of about 0.211 inches and may be referred to as a radial projection. The second outer diameter surface 528 may have a length of about 0.125 inches and a diameter of about 10.694 inches. The first angled wall 568 may have a slope $\Theta_A$ of about 10 degrees. The third outer diameter surface 530 may have a length of about 0.38 inches and a diameter of about 10.890 inches. The third angled wall 572 may have a slope $\Theta_B$ of about 45 degrees. The third outer diameter surface 530 and the fifth outer diameter surface 328 are spaced apart a distance of about 1.38 inches and each have an outer diameter of about 10.89 inches. Thus, the fourth outer diameter surface 536 has a length less than 1.38 inches and may further have a diameter of about 10.25 inches.

The dimensions disclosed above for valve seat 312, advantageously allow the seat pressure seal 314 to slip onto the seat recess 318 with reduced or eliminated need for grease, allow for air pockets to exhaust into the throughbore 348 when the valve seat 312 moves, allow for redundant metal-to-metal contacts between the distal surface 354 and the distal radial wall 350, thereby to provide enhanced protection from leaks or valve failure and while providing an case of installation, and reduced particle migration toward the seat pressure seal 314, among other features described and discussed above.

FIG. 5B illustrates a sectional view of the valve seat 312 with a seat pressure seal 314 and the debris protection seal 316 positioned thereon to clarify seal positioning. The seat pressure seal 314 includes a three component seal that will be discussed in detail in FIGS. 7A-7B. The debris protection seal 316 will be discussed in FIGS. 6A-6C. The seat pressure seal 314 includes a male portion, or component, engaged with a female portion, or component. The male and the female components may be in abutting contact such that an axial force, as exerted onto the valve seat 312 by a movement of the gate 110 in the direction 361 illustrated in FIG.

3, compresses the components axially together which causes a seal, by a radially expansion of the female components, between the valve seat 312 and the bore of the valve body, specifically, between the first outer diameter surface 510 of the valve seat 312 and the first radial recess wall 330 of the valve body. The seal created from the axial compression and radial expansion produces a sealing power of the seal to reduce leaks during fluid flow operations of the gate valve 100. Furthermore, each of the male and the female components have an annular body such that the male component of the seat pressure seal 314 is a male spreader ring and the female portion includes a female seal member having an opening configured to receive the first male spreader ring to sealingly abut the female seal member to the bore of the valve body and the valve seat.

FIG. 6A is a sectional view of a debris protection seal 600, according to an embodiment of the disclosure. FIG. 6B is a partial perspective view of the debris protection seal 600, according to one embodiment of the disclosure. FIG. 6C is a perspective view of the debris protection seal having a spiral groove, according to one embodiment of the disclosure. The debris protection seal 600 may be the debris protection seal 212 from FIGS. 1-2D, and 4A-4E. Further, the debris protection seal 600 may be the debris protection seal 312 from FIGS. 3A-3D, 5A and 5B. To be clear, the debris protection seal 600 embodies debris protection seal 212 and 312.

The debris protection seal 600 includes a first component 601 and a second component 650. The first component 601 includes an annular body 610 with a distal end 602, a proximal surface 604, an inner diameter surface 606, and an outer diameter surface 608. The distal end 502 is opposite the proximal surface 504. The inner diameter surface 506 is opposite and substantially parallel to the outer diameter surface 508. The distal end 602 includes a distal surface 612 having a grooved pattern 614 positioned therein to be in abutting contact the distal radial wall 250 (or 350) of the valve body. The grooved pattern 614 may be a spiral so as to increase surface area of the annular body 610 to elongate a debris path by the debris particle to reach a seat pressure seal, such as seat pressure seals 214, 314, thereby to reduce a risk of leaks from debris interference of the sealing power of the seat pressure seal when in operation. Conventionally, a debris traversing a conventional debris seal may take a path of less resistance increasing the likelihood of obtaining access to the seal area by moving radially across the debris seal. Comparatively, the debris protection seal 600 advantageously encourages the debris to follow the spiral, thereby increasing the surface area of a conventional debris seal to elongate the trajectory of the debris across the debris protection seal 600 to reduce the risk of the debris accessing the seat pressure seals to cause leaks. As illustrated, the spiral of the grooved pattern 614 may have several spiral paths 616. The spiral path 616 is visually represented in FIG. 6C. Each of the spiral paths 616 is a wind of the spiral, as shown in a sectional view, with a depth D of about 0.063 inches into the annular body 610 from the distal surface 612. Each spiral path 616 may be separated by a substantially flat surface 618 from an adjacent spiral path 616 by about a length L of about 0.023 inches. The flat surface 618 contacts the distal radial wall 250, 350 when the debris protection seal 600 is installed within an installed valve seat within a valve body. In some embodiments, as illustrated, each of the several spiral path 616 may have an opening that widens towards a distal direction. Stated differently, the depth of each spiral path 616 has more surface area than the flat surface 618. In one embodiment, each spiral path 616 widens at an angle $\theta$ of about 35 degrees. The proximal surface 604 may have a height H of about 0.304 inches. The inner diameter surface 606 may have a width W of about 0.195 inches with a diameter of about 7.316 inches. The outer diameter surface 608 may have a diameter of about 7.924 inches.

The second component 650 of the debris protection seal 600 may be a compressible ring. In one embodiment, the second component 650 may be an o-ring, although other ring shapes are contemplated. The second component 650 may be configured to be in abutting contact with the proximal surface 604 of the annular body 610 of the first component 601 and the valve seat 212, 312 when installed in seal recess, such as seal recess 218, or 318. Furthermore, the second component 650 is configured to thrust the first component 601 towards and into contact with the distal radial wall 250, 350. For example, the axial force produced from the gate 110 movement, as described in FIGS. 2A and 3A, may compress the second component 650 before the first component 601 is deformed by compression. Therefore, the second component 650, being less rigid than the first component 601, will absorb the axial force energy by compression to produce an elastic energy onto the first component 601 so that the first component 601 retains and maintains contact with the distal radial wall 250, or 350, when installed. Thus, in one example, an o-ring maybe compressed to energize the debris protection seal 600 into abutting contact with the distal radial wall 250, or 350 of the valve body to reduce debris migration towards the seat pressure seal when in operation.

Figure 7A:
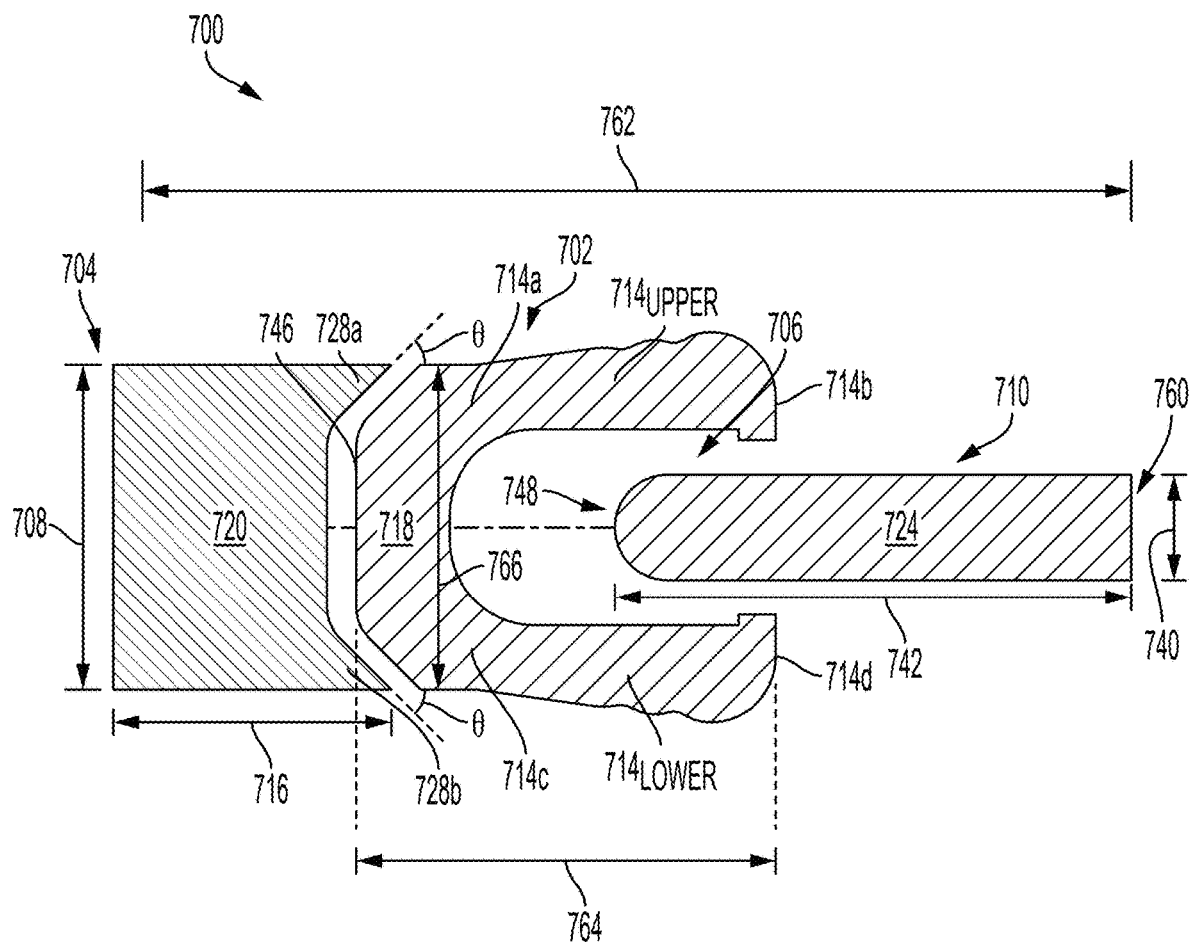
FIG. 7A is a sectional view of one embodiment of the seat pressure seal, using a three component seal, according to one embodiment of the present disclosure.
Figure 7B:
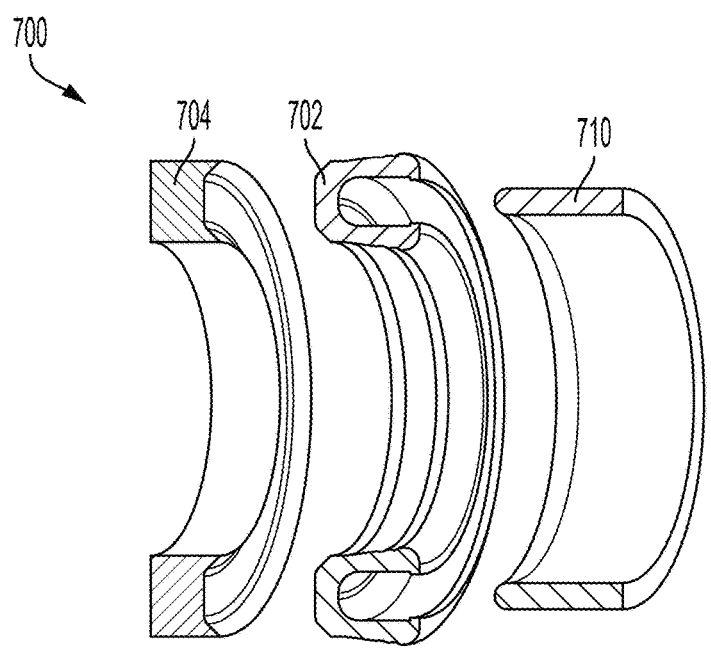
FIG. 7B is a partial perspective view of the seat pressure seal embodiment of FIG. 7A, according to one embodiment of the present disclosure.

FIG. 7A is a sectional view of one embodiment of the seat pressure seal 214, or 314, using a three component seal, according to one embodiment of the present disclosure. FIG. 7B is a partial perspective view of the seat pressure seal embodiment of FIG. 7A. The following will disclose an embodiment of a seat pressure seal 700 applicable to the valve seat embodiments from FIGS. 1-2D, and 4A-4E (using valve seat 212) and FIGS. 3A-3D, 5A and 5B (using valve seat 312).

The seat pressure seal 700 includes an annular female seal member 702 with an opening 706, an annular male spreader ring 710, and an alignment ring 704. In one embodiment, the female seal member 702 includes polytetrafluoroethylene ("PTFE"). In another embodiment, the seat pressure seal 700 has a length 762 substantially equal to the first pocket 270, or the pocket 370. The opening 706 faces opposite the alignment ring 704. The alignment ring 704 is positioned to abut the shoulder 259. The male spreader ring 710 abuts or faces the distal radial wall 250, 350 of the seat recess 218, 318 on the valve body.

The opening 706 is configured to receive the male spreader ring 710 to seal the female seal member 702 against the valve seat and the valve body when the gate 110 produces the axial force, discussed above. Moreover, the female seal member 702 has a backside surface 746, that abuts a complementing distal surface 756 of the alignment ring 704. The backside surface 746 directly contacting the alignment ring 704 is advantageous as the contact provides a sturdy construction able to endure prolonged operation of the seat pressure seal 214, 314 with significantly reduced fatigue or failure.

The opening 706 is defined and partially enclosed by a first upper leg $714_{UPPER}$, further including a first end $714a$ directly connected to a female seal member body 718 and a second end $714b$ positioned away from the female seal member body 718, and by a lower leg $714_{LOWER}$, further including a first end $714b$ directly connected to the female seal member body 718 and a second end $714d$ positioned away from the female seal member body 718. In one embodiment, the female seal member body 718 and the first legs $714_{UPPER}$, $714_{LOWER}$ together have a length 764 of about 0.269+/−0.003 inch. In one embodiment, the female seal member body 718 has a height 766 of about 0.207 inches. In one embodiment, the female seal member body 718 has a maximum outer diameter, while at rest, of about 10.736 inches and a minimum inner diameter, while at rest, of about 10.237 inch.

The male spreader ring 710 includes a male spreader ring body 724 having a length 742 of about 0.211 inches and a height 740 of about 0.600 inches. A distal end 760 of the male spreader ring body 724 may be configured to abut the distal radial wall 250, 350 during valve operation. A proximal end 748 of the male spreader ring body 724 may be configured to abut the depth of the female seal member body 718 to sealingly abut the annular female seal member 702 to the bore of the valve body and the valve seat 212, 312.

The alignment ring 704 has an annular body 720 having a length 716 of about 0.096 inches and a height 708 of about 0.207 inches. Further, the annular body 720 of the support ring has the distal surface 756 that complements the backside surface 746 of the female seal member 702. In the embodiment illustrated, the distal surface 756 has an outer angled projection 728a and an inner angled projection 728b. Each of the angled projections have a slope θ of about 45 degrees. In some embodiments, the maximum outer diameter of the alignment ring 704 is about 10.694 inches and the minimum inner diameter of the alignment ring 704 is about 10.279 inches.

Figure 8:
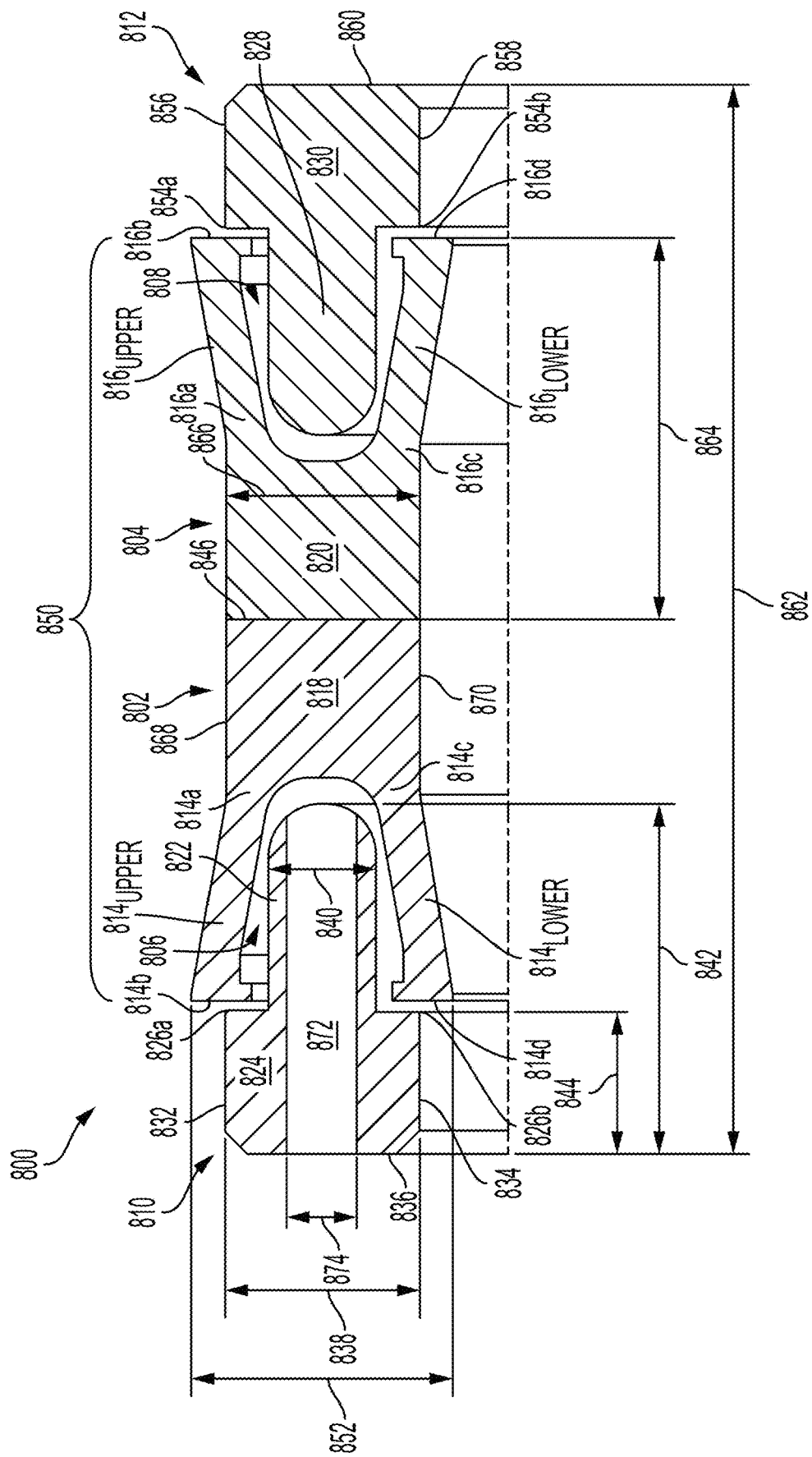
FIG. 8 is a sectional view of an embodiment of an annular seat pressure seal taken along the lines of FIG. 8 of the exploded sectional view of FIG. 2A, and the sectional view of 4D, according to an embodiment of the disclosure.

FIG. 8 is a sectional view of an embodiment of an annular seat pressure seal 214 taken along the lines of FIG. 8 of the exploded sectional view of FIG. 2A, and the sectional view of 4D, according to an embodiment of the disclosure. To be clear, the following seat pressure seal 800 applies to the valve seat 212 embodiment of FIGS. 1-2D, and 4A-E using seat pressure seal 214.

The seat pressure seal 800 includes an annular first female seal member 802 with a first opening 806 and an annular second female seal member 804 with a second opening 808 facing opposite the first opening 806, an annular first male spreader ring 810, and an annular second male spreader ring 812. In one embodiment, the first female seal member 802 includes polyetheretherketone ("PEEK") and the second female seal member 804 includes PTFE. In another embodiment, the first female seal member 802 and the second female seal member 804 each include PTFE. In one embodiment, the second female seal member 804 further includes a spring therein constructed with at least stainless steel. In one embodiment, the seat pressure seal 800 has a length 862 of about 0.940+/−0.005 inch. The first opening 806 and the second opening 808 face opposite of each other such that the first male spreader ring 810 faces the shoulder 259, and the second male spreader ring 812 abuts or faces the distal radial wall 250 of the seat recess 218 on the valve body 202. The first opening 806 is configured to receive the first male spreader ring 810 to seal the first female seal member 802 against the valve seat 212 and the valve body 202. The second opening 808 is configured to receive the second male spreader ring 812 to seal the second female seal member 804 against the valve seat 212 and the valve body 202 when the gate 110 compresses against the valve seat 212. Moreover, the first female seal member 802 and the second female seal member 804 each have a backside surface 846, 848 that abut each other to establish an X-shape defined by the seat pressure seal central portion 850. The backside surfaces 846, 848 directly contacting each other are advantageous as the seat pressure seal 800 provides a sturdy construction able to endure prolonged operation with significantly reduced fatigue or failure as the valve 100 may be bi-directional and able to seal in either flow orientation. In one embodiment, the first female seal member 802 and the second female seal member 804 have the same dimensions and have a cross-sectional profile that is symmetrical.

The first opening 806 is defined and partially enclosed by a first upper leg $814_{UPPER}$, further including a first end 814a directly connected to a first female seal member body 818 and a second end 814b positioned away from the first female seal member body 818, and by a first lower leg $814_{LOWER}$, further including a first end 814c directly connected to the first female seal member body 818 and a second end 814d positioned away from the first female seal member body 818. In one embodiment, the first female seal member body 818 and the first legs $814_{UPPER}$, $814_{LOWER}$ together have a length 864 of about 0.335+/−0.005 inch. In one embodiment, the first female seal member body 818 has a height 866 of about 0.174+/−0.005 inch. In one embodiment, the first female seal member body 818 has an outer surface 868 having a diameter of about 9.396+/−0.005 inch and an inner surface 870 having a diameter of about 9.048+/−0.002 inch.

The second opening 808 is defined and partially enclosed by a second upper leg $816_{UPPER}$, further including a first end 816a directly connected to a second female seal member body 820 and a second end 816b positioned away from a second female seal member body 820, and by a second lower leg $816_{LOWER}$, further including a first end 816c directly connected to a second female seal member body 820 and a second end 816d positioned away from the second female seal member body 820.

The first male spreader ring 810 includes a male extension 822 that centrally extends away from a first male spreader ring body 824 defined by a first outer diameter surface 832, a first inner diameter surface 834, and a first side surface 836. In one embodiment, the first male spreader ring 810 has a length 842 of about 0.307+/−0.005 inch and the first male spreader ring body 824 has a length 844 of about 0.125+/−0.005 inch. In one embodiment, the first male spreader ring 810 includes PEEK or similar material. In one embodiment, the first male spreader ring 810 includes one or more throughways 872 equally spaced about the first male spreader ring 810. For example, in an embodiment where four throughways 872 are present, the first male spreader ring 810 will have one throughway 872 positioned in every quarter of the first male spreader ring 810. In those examples, the throughway 872 has a diameter 874 of about 0.063+/−0.005 inch. The throughways 872 advantageously allow pressure to pass through to enable a radial expansion to sealing contact the seat pressure seal to the valve body 202 and the valve seat 212. An upper shoulder 826a connects the first outer diameter surface 832 and the male extension 822 and a lower shoulder 826b connects the first inner diameter surface 834 and the male extension 822. In one embodiment, the first outer diameter surface 832 has a diameter of about 9.394+/−0.005 inch, the first inner diameter surface 834 has a diameter of about 9.048+/−0.005 inch, and the distance 838 between the first outer diameter surface 832 and the first inner diameter surface 834 is about 0.173+/−0.005 inch. The male extension 822 is configured to enter the first opening 806 of the first female seal member 802. In one embodiment, the male extension 822 has a thickness 840 of about 0.096+/−0.005 inch. The upper shoulder 826a is configured to contact the second end 814b of the first upper leg $814_{UPPER}$. The lower shoulder 826b is configured to contact the second end 814d of first lower leg $814_{LOWER}$. In one embodiment, the shoulders 826a, 826b push against the second ends 814b, 814d when the valve 100 is in operation such that the first legs 814$_{UPPER}$, 814$_{LOWER}$ each bow in a radial direction to tightly seal against the valve body 202 and tightly seal against the valve seat 212. In one embodiment, the second end 814b has an outermost diameter of about 9.454+/−0.005 inch and the second end 814d has an innermost diameter of about 8.988+/−0.005 inch to define a distance 852 of about 0.233+/−0.005 inch.

The second male spreader ring 812 includes a male extension 828 that centrally extends away from a second male spreader ring body 830 defined by a second outer diameter surface 856, a second inner diameter surface 858, and a second side surface 860. In one embodiment, the second male spreader ring 812 has the same dimensions as the first male spreader ring 810 discussed above. In one embodiment, the second male spreader ring 812 includes PTFE or similar material. In one embodiment, the second male spreader ring 812 and the second female seal member 804 includes 5% moly modified PTFE. In one embodiment, the second male spreader ring 812 includes PEEK. An upper shoulder 854a connects the second outer diameter surface 856 and the male extension 828, and a lower shoulder 854b connects the second inner diameter surface 858 and the male extension 828. The male extension 828 is configured to enter the second opening 808 of the second female seal member 804. The upper shoulder 854a is configured to contact the second end 816b of the second upper leg 816$_{UPPER}$. The lower shoulder 854b is configured to contact the second end 816d of second lower leg 816$_{LOWER}$. In one embodiment, the shoulders 854a, 854b push against the second ends 816b, 816d when the valve 100 is in operation such that the second legs 816$_{UPPER}$, 816$_{LOWER}$ each bow in a radial direction to tightly seal against the valve body 202 and tightly seal against the valve seat 212. In one embodiment, the first male spreader ring 810 and the second male spreader ring 812 each include PEEK and extend into the first female seal member 802 and the second female seal member 804 each including PTFE, respectively, to restrict axial movement and thereby protect the annular compression spring 140 from being overly compressed and cause deformation.

Figure 9A:
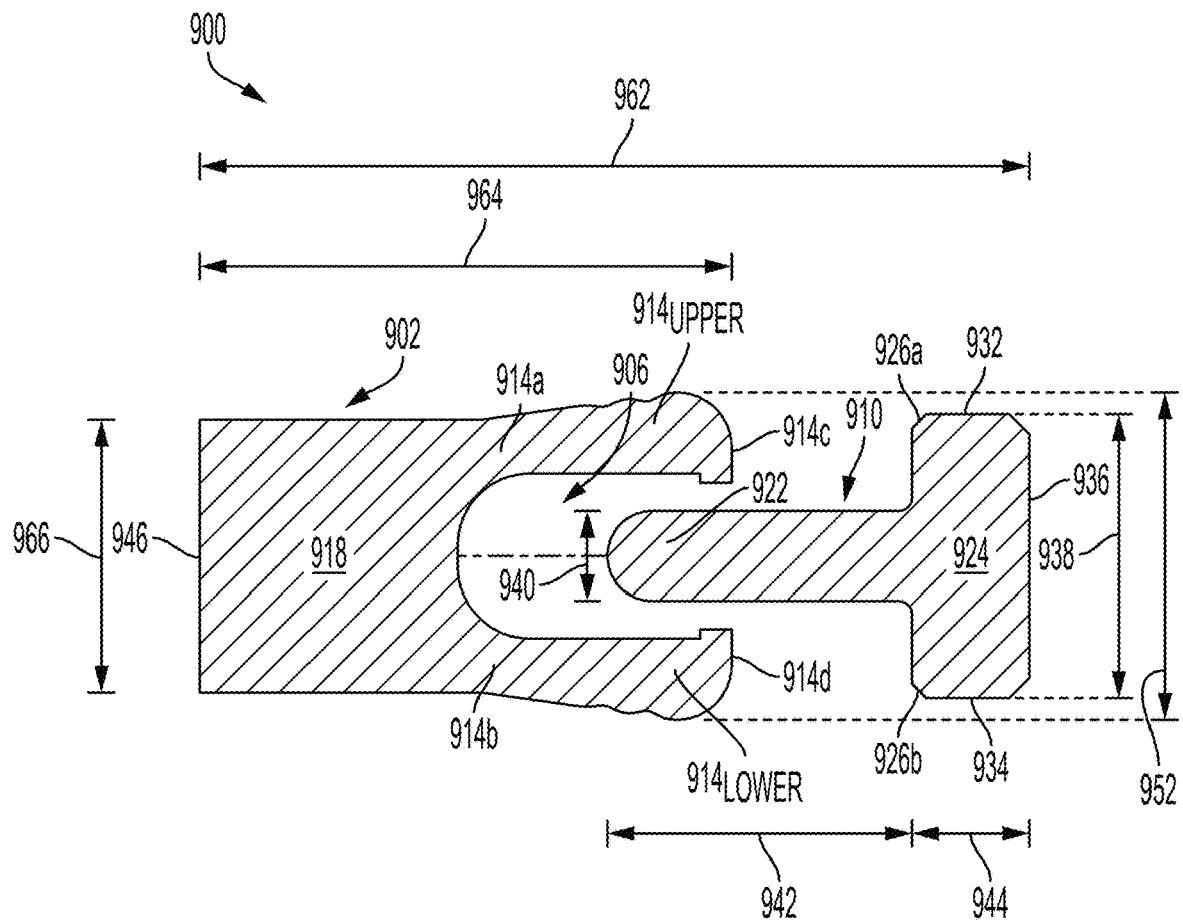
FIG. 9A is a sectional view of one embodiment of the seat pressure seal, using a two component seal, according to one embodiment of the disclosure.
Figure 9B:
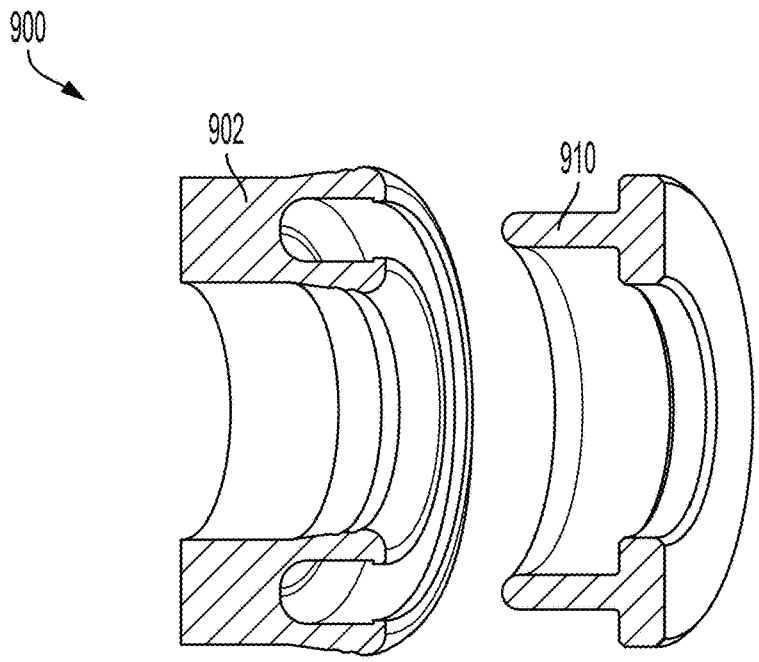
FIG. 9B is a partial perspective view of the seat pressure seal embodiment of FIG. 9A, according to one embodiment of the disclosure.

FIG. 9A is a sectional view of one embodiment of the seat pressure seal 214, using a two component seal, according to one embodiment of the disclosure. FIG. 9B is a partial perspective view of the seat pressure seal embodiment of FIG. 9A. The following will disclose an embodiment of a seat pressure seal 900 applicable to the valve seat 212 embodiments from FIGS. 1-2D, and 4A-4E using seat pressure seal 214.

The seat pressure seal 900 includes an annular female seal member 902 with an opening 906 and an annular male spreader ring 910. In one embodiment, the seat pressure seal 900 has a length 962 substantially equal to the first pocket 270. The opening 906 is configured to receive the male spreader ring 910 to seal the female seal member 902 against the valve seat 212 and the valve body 202 when the gate 110 produces the axial force, discussed above. The opening 906 faces opposite a proximal surface 946. The proximal surface 946 is positioned to abut the shoulder 259 on valve seat 212. The proximal surface 946 directly contacting the shoulder 259 on valve seat 212 is advantageous as the contact provides a sturdy construction able to endure prolonged operation of the seat pressure seal 214 with significantly reduced fatigue or failure. The male spreader ring 910 abuts or faces the distal radial wall 250 of the seat recess 218 on the valve body 202.

The opening 906 is defined and partially enclosed by an upper leg 914$_{UPPER}$, further including a first end 914a directly connected to a female seal member body 918 and a second end 914c positioned away from the female seal member body 918, and by a lower leg 914$_{LOWER}$, further including a first end 914b directly connected to the female seal member body 918 and a second end 914d positioned away from the female seal member body 918. In one embodiment, the female seal member body 918 and the legs 914$_{UPPER}$, 914$_{LOWER}$ together have a length 964 of about 0.359+/−0.005 inch. In one embodiment, the female seal member body 918 has a height 966 of about 0.407 inches. In another embodiment, the female seal member body 918 has a maximum outer diameter, while at rest, of about 9.400 inches and a minimum inner diameter, while at rest, of about 8.993 inches.

The male spreader ring 910 includes a male extension 922, having a length 942 of about 0.216 inches and a height 940 of about 0.065 inches that centrally extends away from a male spreader ring body 924 defined by an outer diameter surface 932, an inner diameter surface 934, and a distal surface 936. In one embodiment, the male spreader ring body 924 has a length 944 of about 0.084 inches. An upper shoulder 926a connects the outer diameter surface 932 and the male extension 922 while a lower shoulder 926b connects the inner diameter surface 934 and the male extension 922. In one embodiment, the outer diameter surface 932 has a diameter of about 9.400+/−0.002 inch, the inner diameter surface 934 has a diameter of about 8.993+/−0.002 inch, and the distance 938 between the outer diameter surface 932 and the inner diameter surface 934 is about 0.407 inches. The male extension 922 is configured to enter the opening 906 of the female seal member 902. In one embodiment, the male extension 922 has a thickness 940 of about 0.065+/−0.002 inch. The upper shoulder 926a is configured to contact the second end 914c of the upper leg 914$_{UPPER}$. The lower shoulder 926b is configured to contact the second end 914d of lower leg 914$_{LOWER}$. In one embodiment, the shoulders 926a, 926b push against the second ends 914c, 914d when the valve 100 is in operation such that the legs 914$_{UPPER}$, 914$_{LOWER}$ each bow in a radial direction to tightly seal against the valve body 202 and tightly seal against the valve seat 212. In one embodiment, the second end 914c has an outermost diameter of about 9.446+/−0.002 inch and the second end 914d has an innermost diameter of about 8.947+/−0.002 inch to define a distance 952 of about 0.499 inch.

FIG. 10A is a sectional view of an embodiment of an alignment collar of FIG. 4E, according to one embodiment of the disclosure. FIG. 10B is a partial perspective view of the alignment collar embodiment of FIG. 10A. FIG. 10C is side elevational view of the alignment collar embodiment of FIG. 10A. The following will disclose an embodiment of an alignment collar 1000 applicable to the valve seat 212 embodiments from FIGS. 1-2D, and 4A-4E. Specifically, the valve seat 212 of FIG. 4E using the alignment collar 442.

The alignment collar 1000 includes a body 1002 that may have a substantially rectangular shape, although other shapes are contemplated. The body 1002 includes an inner diameter surface 1004, an outer diameter surface 1006, a first side surface 1008, a second side surface 1010. If installed in the orientation as illustrated, the first side surface 1008 is configured to contact the radial projection 274 adjacent the first pocket 270 while the second side surface 1010 is configured to abut the distal radial wall 250. In some embodiments, the alignment collar 1000 has length 1012 of about 0.510 inches and a height 1014 of about 0.201 inches. The inner diameter surface 1004 may have a diameter of about 8.992 inches to about 9.987 inches. The outer diameter surface 1006 may have a diameter of about 9.394 inches.

The alignment collar 1000 may have slots 1016 positioned on both the inner diameter surface 1004 and the outer diameter surface 1006. These slots 1016 advantageously enable the use of a tool to position or remove the alignment collar 1000 onto, or from, the first pocket 270 of the valve seat 212. In one example, slots 1016 positioned on the inner diameter surface 1004 may be about 180 degrees apart. In another example, slots 1016 positioned on the outer diameter surface 1006 may be about 180 degrees apart. In still another example, the slots 1016 positioned on the outer diameter surface 1006 may be about 90 degrees apart from the slots 1016 positioned on the inner diameter surface 1004. Each of the slots 1016 may have a depth into the body 1002 of about 0.053 inches and a width of about 0.250 inches across the length 1012.

Figure 11A:
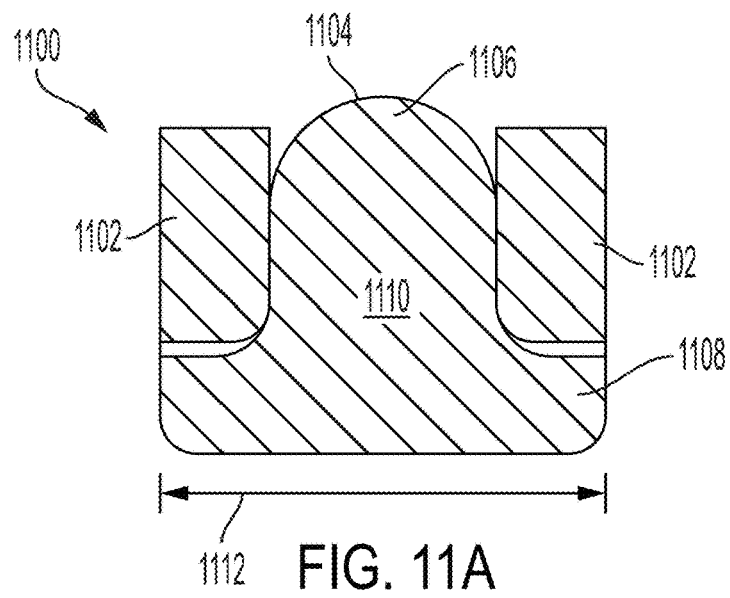
FIG. 11A is a sectional view of an embodiment of a t-seal from FIG. 4C, according to one embodiment of the disclosure.
Figure 11B:
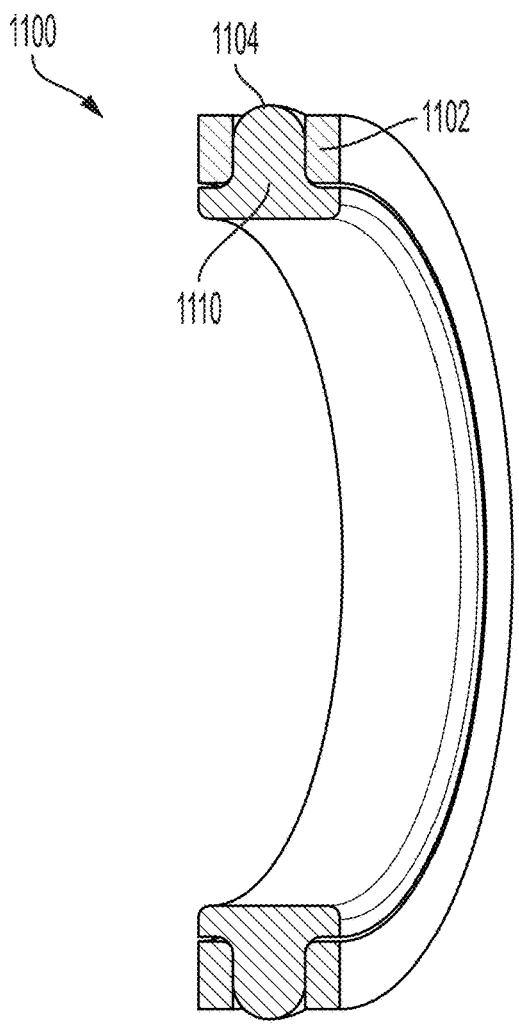
FIG. 11B is a partial perspective view of the t-seal embodiment of FIG. 11A, according to one embodiment of the disclosure.

FIG. 11A is a sectional view of an embodiment of a t-seal from FIG. 4C, according to one embodiment of the disclosure. FIG. 11B is a partial perspective view of the t-seal embodiment of FIG. 11A. The following will disclose an embodiment of a t-seal 1100 applicable to the valve seat 212 embodiments from FIGS. 1-2D, and 4A-4E within the second pocket 272. Specifically, the valve seat 212 of FIG. 4C using the t-seal as the seat pressure seal 215. To be clear, the t-seal 1100 may be an embodiment of the seat pressure seal 215.

The t-seal 1100 may be a common seal used for static sealing between two surfaces. For example, a t-seal 1100 may be used as the seat pressure seal 215 within the second pocket 272 of the valve seat 212. The t-seal may be a three component seal. Two of the three components may be rigid retainer rings 1102 that partially straddle a narrow projection 1106 of a third elastomeric component 1110. The third elastomeric component 1110 may possess a base 1108 and the narrow projection 1106 extending from the base 1108. The narrow projection 1106 extends a small distance beyond the outermost diameter of the rigid retainer rings 1102 to provide a rounded surface 1104 to contact a desired sealing surface, such as the first radial recess wall 230 of valve body 202 while the base 1108 may be configured to contact a second desired sealing surface, such as the third outer diameter surface 430 of the second pocket 272 of FIG. 4A, thus enabling a static seal between the two sealing surfaces. The base 1108 may extend axially outward a width greater than the narrow projection 1106, as illustrated in FIG. 11A. The rigid retainer rings 1102 may be supported on the widest portions of the base 1108. Furthermore, the t-seal 1100 may a width 1112 substantially similar to the length of third outer diameter surface 430 of the second pocket 272.

Figure 12A:
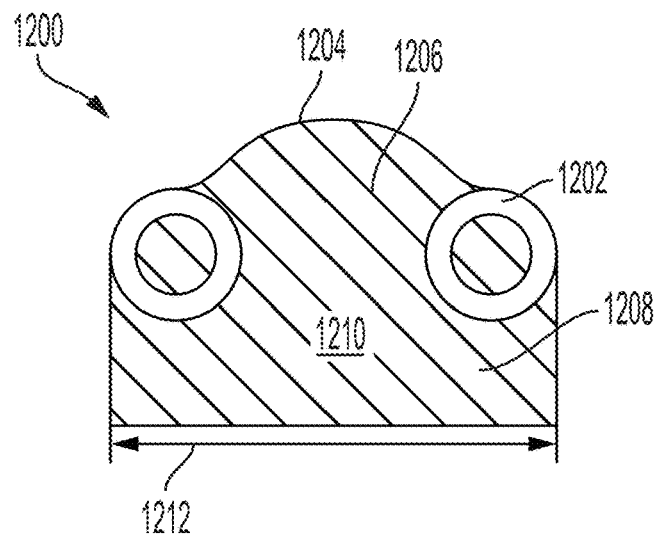
FIG. 12A is a sectional view of an embodiment of an s-seal from FIG. 4D, according to one embodiment of the disclosure.
Figure 12B:
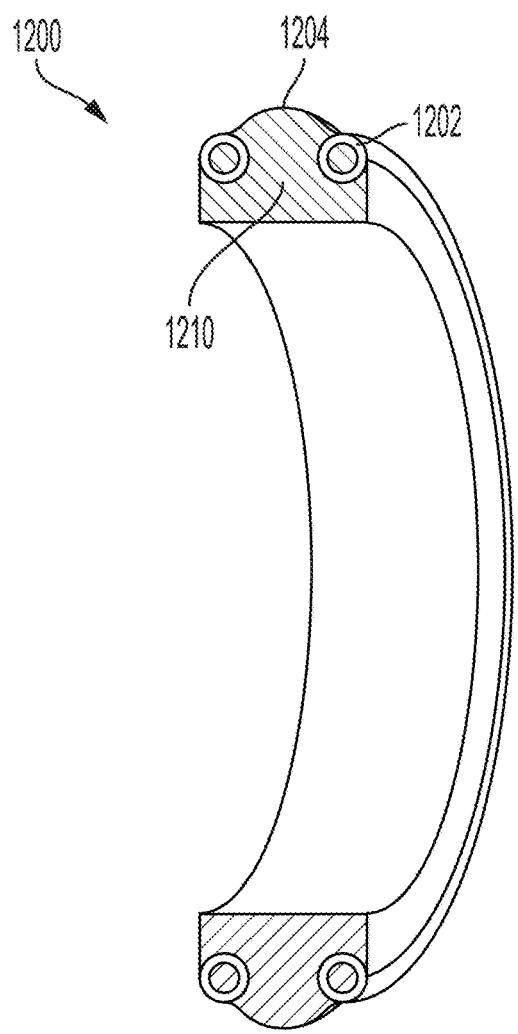
FIG. 12B is a partial perspective view of the s-seal embodiment of FIG. 12A, according to one embodiment of the disclosure.

FIG. 12A is a sectional view of an embodiment of an s-seal from FIG. 4D, according to one embodiment of the disclosure. FIG. 12B is a partial perspective view of the s-seal embodiment of FIG. 12A. The following will disclose an embodiment of an s-seal 1200 applicable to the valve seat 212 embodiments from FIGS. 1-2D, and 4A-4E within the second pocket 272. Specifically, the valve seat 212 of FIG. 4D using the s-seal as the seat pressure seal 215. To be clear, the s-seal 1200 may be an embodiment of the seat pressure seal 215.

The s-seal 1200 may be a common seal used for static sealing between two surfaces. For example, an s-seal 1200 may be used as the seat pressure seal 215 within the second pocket 272 of the valve seat 212. The s-seal may be an integrated three component seal. Two of the three components may be springs 1202 integrated within an elastomer component 1210. The springs 1202 may partially straddle a narrow projection 1206 of the elastomer component 1210. The elastomer component 1210 may possess a base 1208 and the narrow projection 1206 extending from the base 1208. The narrow projection 1206 extends a small distance beyond the outermost diameter of the springs 1202 to provide a rounded surface 1204 to contact a desired sealing surface, such as the first radial recess wall 230 of valve body 202 while the base 1208 may be configured to contact a second desired sealing surface, such as the third outer diameter surface 430 of the second pocket 272 of FIG. 4A, thus enabling a static seal between the two sealing surfaces. The base 1208 may extend axially outward a width greater than the narrow projection 1206, as illustrated in FIG. 12A. The springs 1202 may be integrated within the elastomer component 1210 to be supported on the widest portions of the base 1208, at the widest portions of the narrow projection 1206. Furthermore, the s-seal 1200 may a width 1212 substantially similar to the length of third outer diameter surface 430 of the second pocket 272.

Figure 13A:
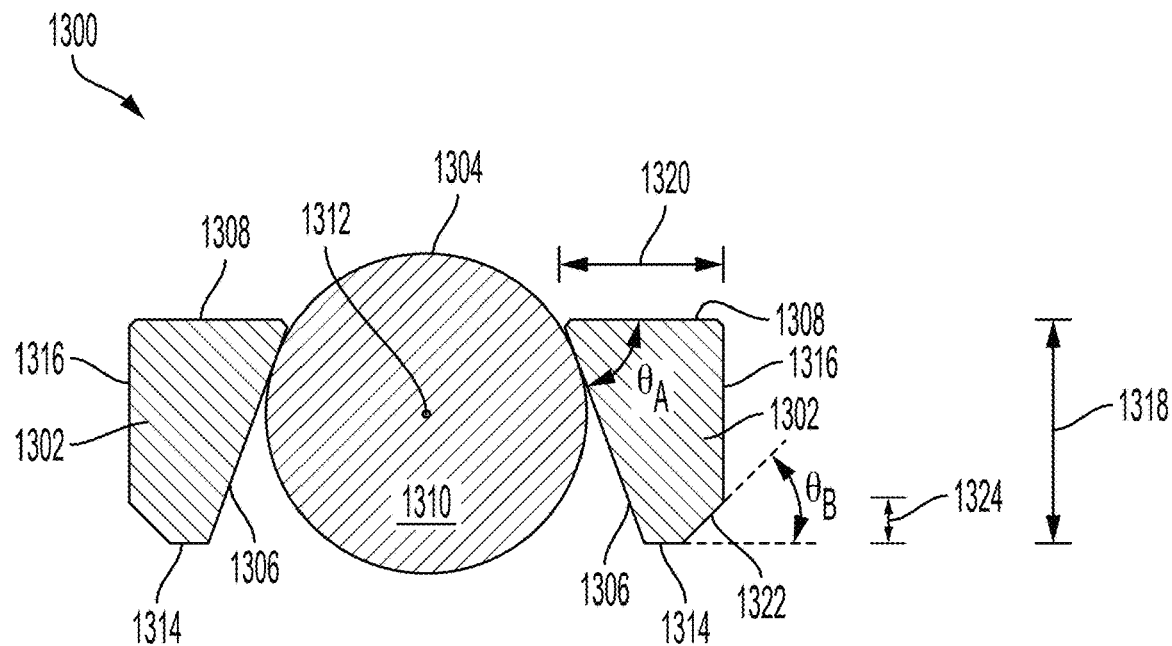
FIG. 13A is a sectional view of an embodiment of an o-ring seal from FIG. 4B, according to one embodiment of the disclosure.
Figure 13B:
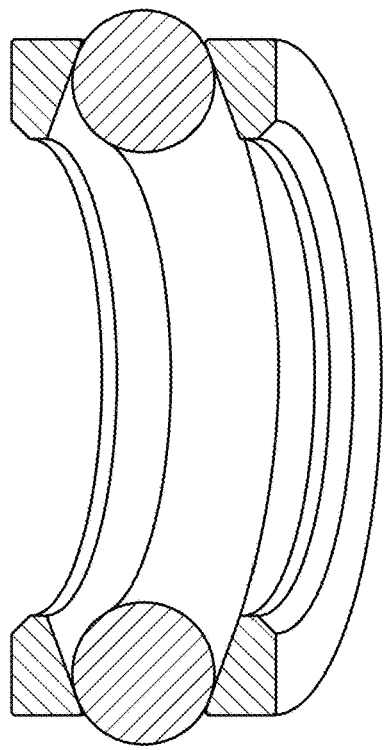
FIG. 13B is a partial perspective view of the o-ring seal embodiment of FIG. 13A, according to one embodiment of the disclosure.

FIG. 13A is a sectional view of an embodiment of an o-ring seal from FIG. 4B, according to one embodiment of the disclosure. FIG. 13B is a partial perspective view of the o-ring seal embodiment of FIG. 13A. The following will disclose an embodiment of an o-ring seal 1300 applicable to the valve seat 212 embodiments from FIGS. 1-2D, and 4A-4E within the second pocket 272. Specifically, the valve seat 212 of FIG. 4B using the o-ring seal as the seat pressure seal 215. To be clear, the o-ring seal 1300 may be an embodiment of the seat pressure seal 215.

The o-ring seal 1300 may be used for static sealing between two surfaces. For example, an o-ring seal 1300 may be used as the seat pressure seal 215 within the second pocket 272 of the valve seat 212. The o-ring seal may be a three component seal. Two of the three components may be rigid retainer rings 1302 that partially straddle to retain an elastomer component 1310, such as an o-ring. The elastomer component 1310 may be a circular shape, as illustrated, that extends a distance beyond the outermost diameter of the rigid retainer rings 1302 to provide a rounded surface 1304 to contact a desired sealing surface, such as the first radial recess wall 230 of valve body 202 while also contacting a second desired sealing surface, such as the third outer diameter surface 430 of the second pocket 272 of FIG. 4A, thus enabling a static seal between the two sealing surfaces. Other shapes of the elastomer component 1310 are contemplated to be used within the rigid retainer rings 1302.

The rigid retainer rings 1302 may be scarf-cut rings having a tapering surface 1306 narrowing from a top surface 1308 to a bottom surface 1314. Additionally, the rigid retainer rings 1302 may further include an outer wall 1316 that is substantially perpendicular to the top surface 1308. The tapering surface 1306 of each of the scarf-cut rings may be in abutting contact with the elastomer component 1310 such that each top surface 1308 has an outer diameter greater than a diameter of a cross-sectional center 1312 of the, for example, o-ring as illustrated. The tapering surface 1306 may have a slope $\theta_A$ of about 70 degrees. The outer diameter of the top surface 1308 may be about 9.404 inches. The rigid retainer rings 1302 may have a height 1318 of about 0.167 inches. The top surface 1308 may have a length 1320 of about 0.116 inches. The bottom surface 1314 may be connected to the outer wall 1316 via an angled wall 1322. The angled wall 1322 may have a height 1324 of about 0.030 inches and a slope $\theta_B$ of about 45 degrees.

Figure 14:
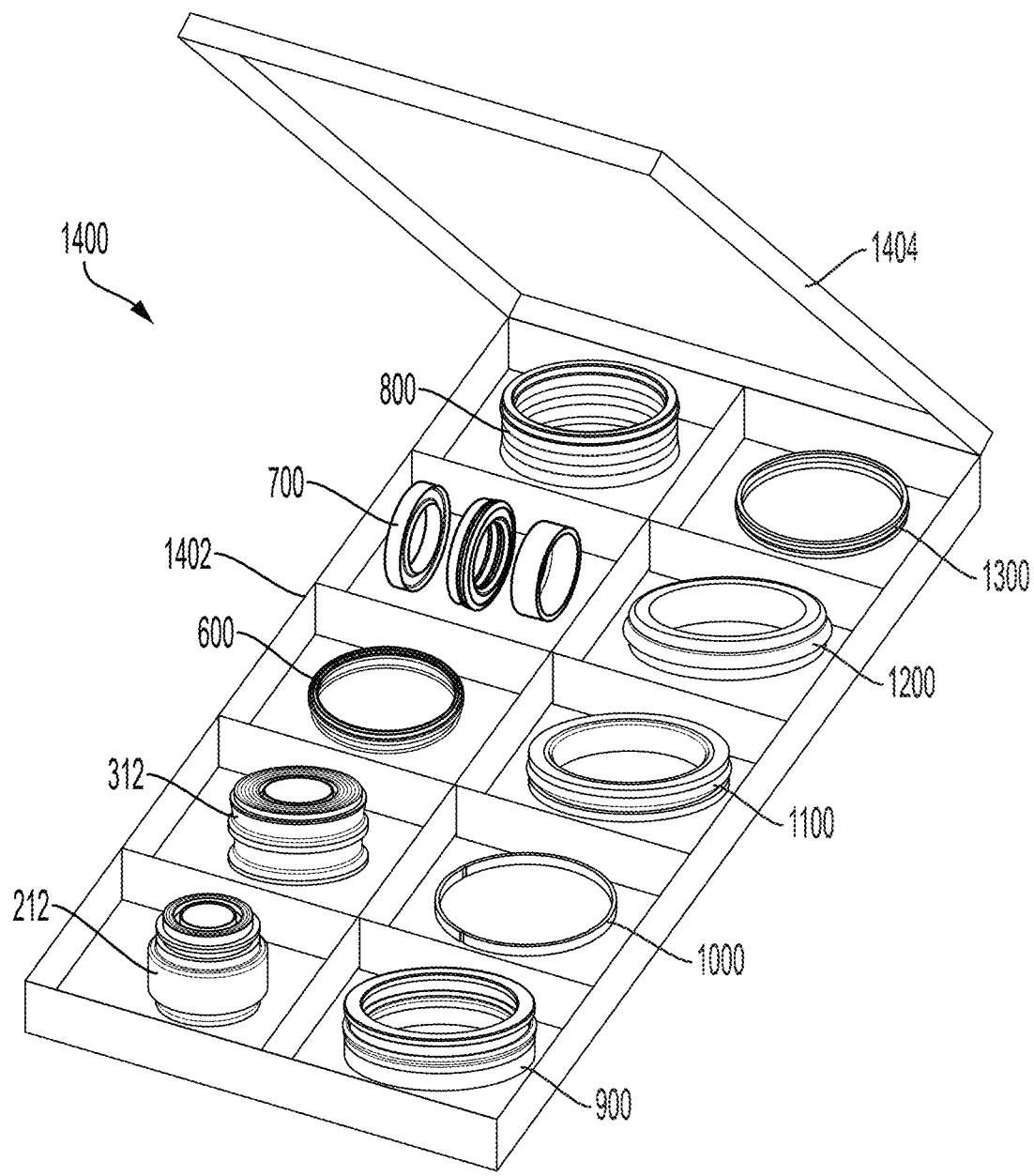
FIG. 14 is a perspective view of a valve seat kit, according to one embodiment of the disclosure.

FIG. 14 is a perspective view of a valve seat kit 1400, according to one embodiment of the disclosure. In all embodiments, the valve seat kit 1400 includes a container 1402. The container 1402 may be a wrapper, a wooden or plastic box, a crate, or a pallet, wherein the container is configured to house or keep the components within the valve seat kit 1400 together or in a specific position. In one embodiment, the container 1402 has a locking feature or a tamper-resistant feature to reduce unauthorized or inadvertent opening of the container 1402. In another embodiment the container 1402 may have a cover 1404.

The valve seat kit 1400 may include, for example, the valve seat 212, the valve seat 312, the debris protection seal 600, the seat pressure seal seat pressure seal 700, the seat pressure seal 800, the seat pressure seal 900, the alignment collar 1000, the t-seal 1100, the s-seal 1200, and the o-ring seal 1300. In one embodiment, the seat pressure seals may each be provided in a disassembled manner to be assembled on site. The valve seat kit 1400 may include more components than illustrated in FIG. 14 to provide multiple valve seat kits. In one embodiment, the valve seat kit 1400 includes fewer components than illustrated in FIG. 14, per desired combination of seals on the desired valve seat. Further, it is to be understood by those skilled in the art that the valve seat kit 1400 also may include addition o-rings, instructional manuals, video tutorials, degreaser packages, grease, cleaning wipes or cloth, and the like positioned with the container such as for use during or instructions for installation, as will be understood by those skilled in the art. The components as illustrated within the valve seat kit 1400 of FIG. 14 are not representative of the actual size but rather are enlarged to view component details and numerals.

Figure 15:
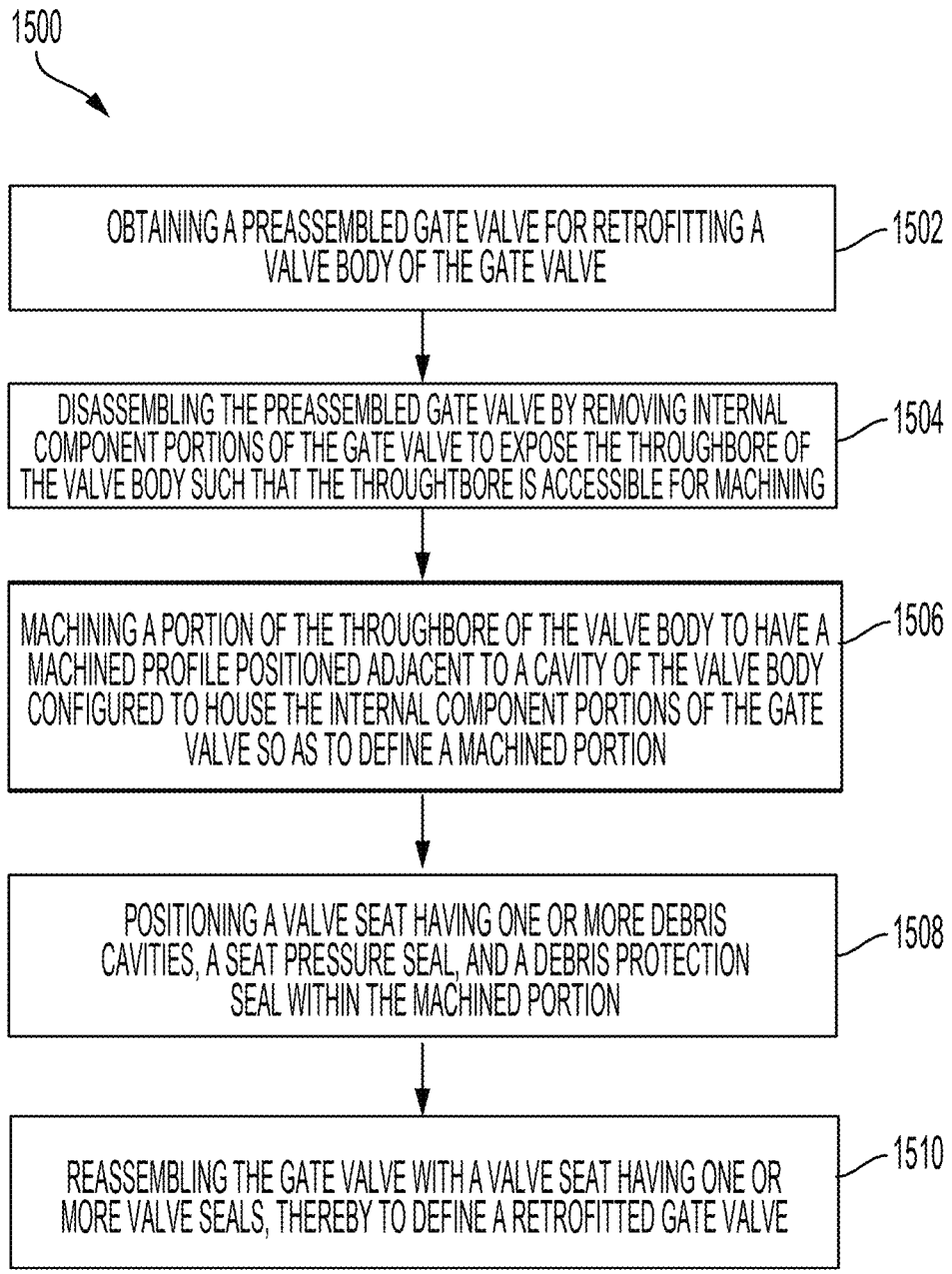
FIG. 15 is a schematic diagram of a method to retrofit a gate valve for increased valve performance, according to one embodiment of the disclosure.

FIG. 15 is a schematic diagram of a method to retrofit a gate valve for increased valve performance, according to one embodiment of the disclosure. The method 1500 details operations that may occur to obtain a desired valve body profile defined by the seat recess 218, or 318, discussed above, for a valve seat within a preassembled, or pre-used, gate valve body. The method 1500 will be discussed below using the reference numerals of the valve seat 212 embodiment of FIGS. 1-2D and 4A-4E. However, the method 1500 is equally applicable to the valve seat 312 embodiment of FIGS. 3A, 3B, 5A, and 5B.

The method 1500 begins at block 1502 where a user obtains a preassembled gate valve for retrofitting the valve body of the gate valve 100. The valve body, such as valve body 202 may be obtained from an old gate valve needing repair from damage from service fluids, a gate valve that may be under performing in the intended service, or an unused preassembled gate valve. In one embodiment, the method 1500 may be used to retrofit an existing gate valve having face seals to a gate valve with diametric seals.

At block 1504, the preassembled gate valve is disassembled, or stripped, of internal components by removing any internal component portions of the gate valve to expose the throughbore of the valve body. In one embodiment, the internal component portions may be positioned in the cavity 238 of the gate valve 100. As discussed above, the internal components may include the gate 110, seats, seals, packing glands, bushings, a yoke, guides, bearings, and the like. Upon removal of the internal components, the valve body 202 may expose the throughbore 248 in preparation for machining, or re-tooling, of the valve body 202.

At block 1506, the valve body 202 is positioned for machining a portion of the throughbore 248 of the valve body 202, thereby to define a profile, e.g., a machined profile in an embodiment, positioned adjacent a cavity 238 of the valve body 202 and configured to house the internal component portions of the gate valve as illustrated in FIG. 2B. A portion of the throughbore 248 which is machined may be positioned and fluidly connected to the cavity 238 of the valve body 202. In one embodiment, the profile is defined by a first radial recess wall 230, a second radial recess wall 232 extending and conically expanding from the first radial recess wall 230 to the cavity 238. In one embodiment, the first radial recess wall 230 has a diameter greater than the throughbore 248. In one embodiment, as discussed above, the second radial recess wall 232 has a slope with an angle 252. Stated differently, the machined profile includes a lip 236 in fluid communication and connecting the throughbore 248 with the cavity 238, a tapering portion concentrically aligned with the bore and defined by the second radial recess wall 232, and a bore concentrically aligned with the throughbore 248 and defined by the first radial recess wall 230.

Upon performing the machining of the valve body 202, as understood by those skilled in the art, the method 1500 proceeds to block 1508 where the gate valve 100 is reassembled with at least a valve seat having one or more debris cavities on the distal surface 254, one or more valve seals, such as a seat pressure seal, and the debris protection seal 216, thereby to define a retrofitted gate valve. Reassembling of the gate valve 100 may be performed by inserting a valve seat 212, having the seat pressure seal 214 and the debris protection seal 216, into the cavity 238 and within the second radial recess wall 232. Further, the valve seat 212 may be slid, or guided, along the second radial recess wall 232 and into the first radial recess wall 230. Once the valve seat 212 is fully inserted, the distal surface 254 of the valve seat 212 may contact the distal radial wall 250 of the seat recess 218 for use in operation of the gate valve 100. Furthermore, reassembling of the gate valve 100 may include positioning any internal component portions, as will be understood by those skilled in the art, back into the cavity 238 or onto the valve body 202 for a completely assembled gate valve 100. Stated differently, the valve 100 may be reassembled using the valve body 202, resulting in an embodiment of the present disclosure including the valve seat 212, the seat pressure seal 214, the debris protection seal 216, the gate 110, the valve stem 106, and other valve components for operation such as in a dirty service, as will be understood by those skilled in the art, with enhanced operational performance and extended service life, as discussed above.

Figure 16:
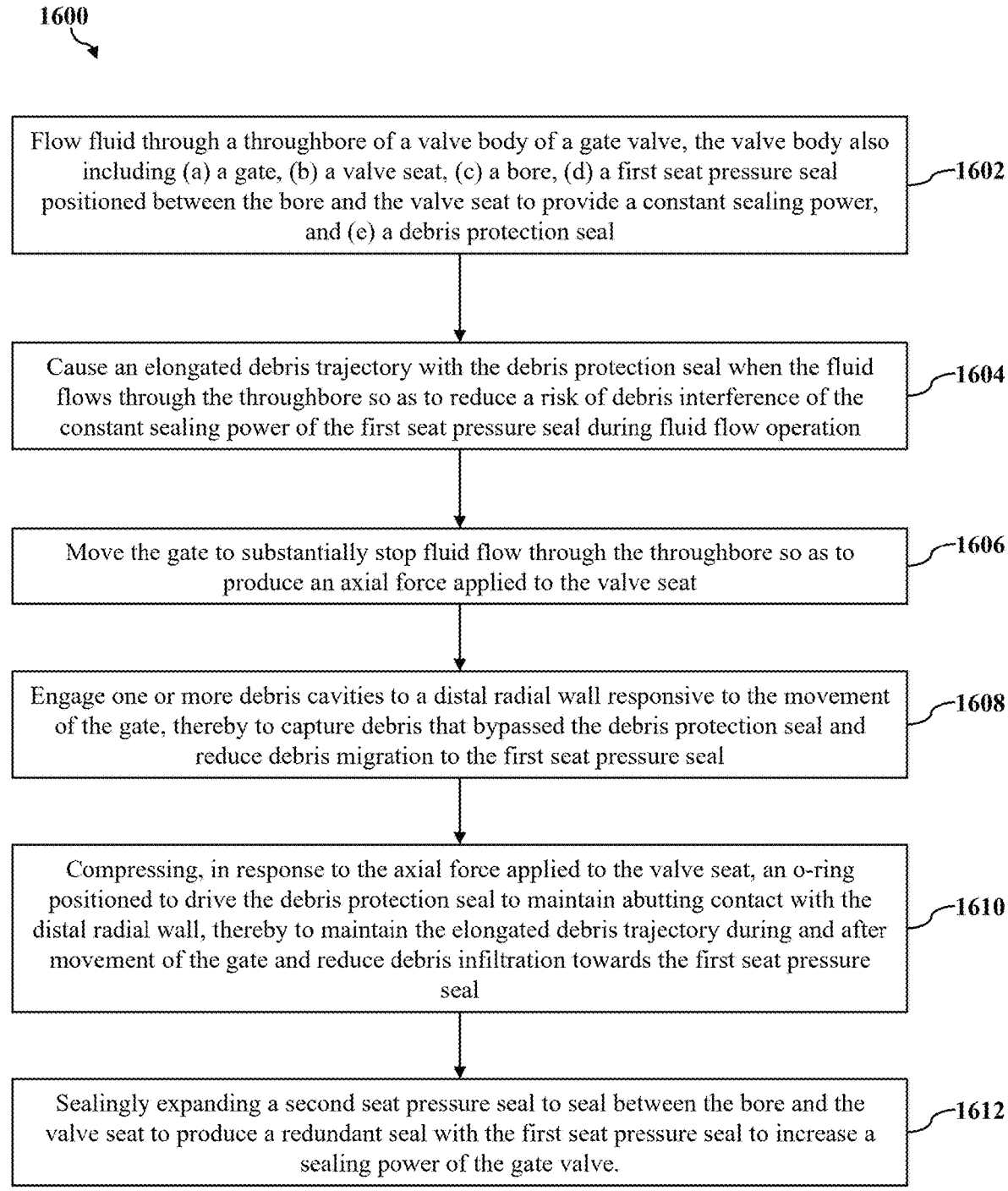
FIG. 16 is a schematic diagram of a method of use to protect against leaks in a gate valve during operation, according to one embodiment of the disclosure.

FIG. 16 is a schematic diagram of a method of use to protect against leaks in a gate valve during operation, according to one embodiment of the disclosure. The method 1600 details operations that may occur to use gate valve having the following components therein to enhance performance and elongate the lifespan of a gate valve. The method 1600 will be discussed below using the reference numerals of the valve seat 212 embodiment of FIGS. 1-2D and 4A-4E. However, the method 1600 is equally applicable to the valve seat 312 embodiment of FIGS. 3A, 3B, 5A, and 5B, unless otherwise noted.

The method 1600 begins at block 1602 by flowing fluid through a throughbore 248 of a valve body 202 of a gate valve 100, such as during normal fluid flow operation. The valve body may also include several components, such as, for example, a gate 110 to control fluid flow through the throughbore 248, a valve seat 212, a bore defined by a surface of the seat recess 218, a seat pressure seal 214 positioned between the bore and the valve seat 212 to provide a constant sealing power during a movement of the gate 110 that controls fluid flow through the throughbore 248, and a debris protection seal 216 in abutting contact with a distal radial wall 250 of the valve body 202.

The method 1600 may continue at block 1604 by causing an elongated debris trajectory via an increase of surface area with the debris protection seal 216 when the fluid flows through the throughbore so as to reduce a risk of debris interference of the constant sealing power of the seat pressure seal 214 during fluid flow operation. As discussed above, the debris protection seal 216, may have a spiral groove that has an increased surface area, compared to conventional seals, to encourage any undesired debris to traverse the spiral path to elongate, and thus reduce the likelihood of the debris obtaining access to the seals. As previously mentioned, debris in the seals significantly reducing the sealing power or causes the seals to fail leading to undesired leaks. In some scenarios, failed seals can be catastrophic to process operations or personnel.

The method 1600 may continue at block 1606 by moving the gate to substantially stop fluid flow through the throughbore so as to produce an axial force applied to the valve seat. As previously mentioned, the gate 100 movements to regulate the fluid flow within the throughbore 248 may produce an axial force upon the valve seat 212 that pushes, or slightly retracts, the valve seat into, or out of, the seat recess 218. Conventionally, these micro-movements allow debris to gain access to the seals. However, because the debris protection seal 216 contains an elastomeric component, such as the second component 650 of the debris protection seal 600, that drives the distal surface 612 into a constant contact with the distal radial wall 250, the micro-movements substantially do not affect the constant contact of the debris protection seal 216 against the distal radial wall 250, thereby to increase the likelihood to preventing, or substantially reducing debris migration to the seals.

At block 1608, the method 1600 continues by engaging one or more debris cavities positioned on a distal surface 254 of the valve seat 212 to a distal radial wall 250 responsive to the movement of the gate 110, thereby to capture debris that bypassed the debris protection seal 216 during fluid flow operations and reduce debris migration to the seat pressure seal. As discussed above, a metal-to-metal contact is desired by the one or more contact sites 440 against the distal radial wall 250 to encapsulate, for example, sand sediment, or the like debris, within the one or more debris cavities that has passed the protection of the debris protection seal 216. The encapsulated debris substantially prevents further debris migration of that debris to the seals, thus reducing the likelihood of a risk of leaks.

The method 1600 may continue at block 1610 by compressing, in response to the axial force applied to the valve seat 212, an o-ring, such as second component 650 of the debris protection seal 600, positioned to drive the debris protection seal 216 to maintain abutting contact with the distal radial wall 250, thereby to maintain the elongated debris trajectory during and after movement of the gate and reduce debris infiltration towards the seat pressure seal.

At block 1612, the method 1600 progresses by sealingly expanding a second seat pressure seal in a radial direction to seal between the bore and the valve seat 212 to produce a redundant seal with the first seat pressure seal as a response to the movement of the gate, thereby to increase a sealing power of the gate valve when the gate valve is substantially closed. Block 1612 may be applicable to an embodiment that uses a first and a second seat pressure seal, such as illustrated in FIGS. 4B-4D.

This U.S. non-provisional patent application claims priority to and the benefit of U.S. Provisional Application No. 63/575,485 filed Apr. 5, 2024, titled "GATE VALVES, GATE VALVE ASSEMBLIES, GATE VALVE SEATS AND SEALS, KITS, AND ASSOCIATED METHODS TO ENHANCE OPERATING LIFE OF GATE VALVES," and U.S. Provisional Application No. 63/715,394, filed Nov. 1, 2024, titled "GATE VALVE SEATS AND SEALS, KITS, AND ASSOCIATED METHODS TO ENHANCE OPERATING LIFE OF GATE VALVES," the disclosures of which are incorporated herein by reference in their entireties.

Other objects, features, and advantages of the disclosure will become apparent from the foregoing figures, detailed description, and embodiments. It should be understood, however, that the figures, detailed description, and embodiments, while indicating specific embodiments of the disclosure, are given by way of illustration only and are not meant to be limiting. Additionally, it is contemplated that changes and modifications within the spirit and scope of the disclosure will become apparent to those skilled in the art from the detailed description. In further embodiments, features from specific embodiments may be combined with features from other embodiments. For example, features from one embodiment may be combined with features from any of the other embodiment. In further examples, additional features may be added to the specific embodiment described herein.

What is claimed is:

1. A gate valve comprising:
   a valve actuator;
   a gate connected to the valve actuator so that the valve actuator actuates the gate during fluid flow operation;
   a valve body having a throughbore extending through the valve body, a cavity having an opening positioned transversely to and in fluid communication with the throughbore to position the gate therein, and a profile at a connection of the throughbore and the cavity, the profile including a bore concentrically aligned with the throughbore and a tapering portion positioned to extend from the cavity to the bore, the bore having a diameter greater than the throughbore and a distal radial wall extending from the bore to the throughbore; and
   a valve seat positioned in the bore and comprising:
   (a) a debris protection seal positioned in a seal recess of the valve seat, the debris protection seal having a distal surface configured to abuttingly contact the distal radial wall of the bore, the distal surface having a grooved pattern positioned therein so as to provide an increased surface area that elongates a debris path by a debris particle to reach the bore, thereby to reduce debris migration to the bore during fluid flow operation that causes an increased risk of leaks, and
   (b) one or more debris cavities positioned in a distal surface of the valve seat, thereby to capture debris that has migrated through the debris protection seal during fluid flow operation further to reduce debris migration to the bore.

2. The gate valve of claim 1, wherein the valve seat further comprises: (c) a seat pressure seal positioned in abutting contact between the bore and the valve seat to provide a seal power to reduce leaks during fluid flow operation, and wherein the debris protection seal and the one or more debris cavities reduce debris migration to the seat pressure seal, thereby to reduce a risk of leaks from debris interference of the sealing power of the seat pressure seal.

3. The gate valve of claim 2, wherein the seat pressure seal comprises a male portion engaged with a female portion in abutting contact to compress axially, thereby to sealingly expand radially.

4. The gate valve of claim 3, wherein the male portion of the seat pressure seal includes a first male spreader ring, and wherein the female portion includes a first female seal member having a first opening configured to receive the first male spreader ring to sealingly abut the first female seal member to the bore of the valve body and the valve seat.

5. The gate valve of claim 4, wherein the seat pressure seal further includes a second female seal member having a second opening configured to receive a second male spreader ring to abut sealingly the second female seal member to the bore of the valve body and the valve seat, the first female seal member abuttingly contacting the second female seal member.

6. The gate valve of claim 4, wherein the first female seal member includes a backside located opposite the first opening and positionable to be in abutting contact with a complementing alignment ring positioned to be in abutting contact with a radial projection of the valve seat.

7. The gate valve of claim 2, wherein the seat pressure seal comprises a first seat pressure seal, wherein the valve seat further includes a second pocket configured to position a second seat pressure seal therein, and wherein the second seat pressure seal includes one or more of a t-seal ring, an s-seal ring, or an o-ring seal.

8. The gate valve of claim 7, wherein the o-ring seal comprises an o-ring straddled and positionably maintained by two adjacent scarf-cut rings, each of the scarf-cut rings having a tapering surface narrowing from a top surface to a bottom surface, and the tapering surface of each of the scarf-cut rings positioned in abutting contact with the o-ring such that each top surface has an outer diameter greater than a diameter of a cross-sectional center of the o-ring.

9. A gate valve comprising:
a valve actuator;
a gate connected to the valve actuator so that the valve actuator actuates the gate during fluid flow operation;
a valve body having a throughbore extending through the valve body, a cavity having an opening positioned transversely to and in fluid communication with the throughbore to position the gate therein, and a profile at a connection of the throughbore and the cavity, the profile including a bore concentrically aligned with the throughbore and a tapering portion positioned to extend from the cavity to the bore, the bore having a diameter greater than the throughbore and a distal radial wall extending from the bore to the throughbore; and
a valve seat positioned in the bore and comprising:
(a) a debris protection seal positioned in a seal recess of the valve seat, the debris protection seal including an annular body having (i) a distal surface, (ii) a proximate surface opposite the distal surface, (iii) an outer diameter surface extending between the distal surface and the proximate surface, and (iv) an inner diameter surface parallel to the outer diameter surface, the distal surface having a grooved pattern that comprises a spiral positioned therein, the distal surface positioned to abuttingly contact the distal radial wall of the valve body so as to provide an increased surface area that elongates a debris path by the debris particle to reach a seat pressure seal, thereby to reduce a risk of leaks from debris interference of a sealing power of the seat pressure seal when in operation, and
(b) one or more debris cavities positioned in a distal surface of the valve seat, thereby to capture debris that has migrated through the debris protection seal during fluid flow operation to further reduce debris migration to the bore.

10. The gate valve of claim 9, wherein the debris protection seal further includes an o-ring positioned in the seal recess of the valve seat and in abutting contact with the proximate surface of the annular body and the valve seat, and wherein the annular body is thrusted towards the distal radial wall by the o-ring such that the o-ring is compressed to energize the debris protection seal into abutting contact with the distal radial wall of the valve body, thereby to reduce debris migration towards the seat pressure seal when in operation.

11. The gate valve of claim 1, wherein the valve seat further comprises: (c) an alignment collar positioned in abutting contact between the bore and the valve seat to provide enhanced operation of other sealing components when in operation.

12. The gate valve of claim 1, wherein the one or more debris cavities are each shaped as substantially half circles in the distal surface of the valve seat such that a substantially flat portion of the distal surface straddles adjacent debris cavities.

13. The gate valve of claim 12, wherein the one or more debris cavities includes at least three debris cavities equidistantly spaced from each other.

14. The gate valve of claim 1, wherein the valve seat further comprises a distal end, a proximal end, an inner diameter surface, and an outer diameter end, and wherein:
the distal end has an outer edge defined by a connection of a first outer diameter surface and the distal surface of the valve seat, the distal surface extending from the outer edge to the inner diameter surface of the valve seat and including, in sequence, the one or more debris cavities, a seal recess, and a ledge defined by the seal recess and a connection of the distal surface and the inner diameter surface of the valve seat,
the proximal end has a proximal surface extending from a first angled wall connected to another outer diameter surface of the valve seat and a second angled wall connected to the inner diameter surface of the valve seat,
the inner diameter surface has a diameter substantially similar to a diameter of the throughbore and extending from the second angled wall of the proximal end to the ledge, the inner diameter surface further having a recess to engage a retraction tool during maintenance, and
the outer diameter end has a first pocket defined by the outer edge and a connection between the first outer diameter surface and a radial projection, the first pocket configured to position a seat pressure seal therein when installed, the radial projection separating the first pocket and a second pocket and further having a second outer diameter surface extending between the first pocket and the second pocket, the second pocket defined by the radial projection, a third outer diameter surface, and a radial wall extending from the third outer diameter surface to a shoulder connecting a fourth outer diameter surface to the radial wall, the second pocket configured to position a second seat pressure seal therein when installed, the outer diameter end further having a fifth outer diameter surface, a third angled wall extending from the fifth outer diameter surface to the sixth outer diameter surface, and the fifth outer diameter surface having a diameter greater than the fourth outer diameter surface or the sixth outer diameter surface.

15. The gate valve of claim 1, wherein the valve seat further comprises a distal end, a proximal end, an inner diameter surface, and an outer diameter end, and wherein:

the distal end has an outer edge defined by a connection of a first outer diameter surface and the distal surface of the valve seat, the distal surface extending from the outer edge to the inner diameter surface of the valve seat and including, in sequence, the one or more debris cavities, a seal recess, and a ledge defined by the seal recess and a connection of the distal surface and the inner diameter surface of the valve seat, the proximal end has a proximal surface extending from a fifth outer diameter surface of the valve seat to the inner diameter surface of the valve seat, the inner diameter surface has a diameter substantially similar to a diameter of the throughbore and extending from the proximal end to the distal end, and the outer diameter end has a pocket defined by the outer edge and a connection between the first outer diameter surface and a radial projection, the pocket configured to position a seat pressure seal therein when installed, the radial projection having a second outer diameter surface extending from the pocket to a seat profile, the seat profile extending between the second outer diameter surface and a third outer diameter surface and having an inner diameter less than a diameter of second outer diameter surface, the third outer diameter surface having a diameter greater than the diameter of second outer diameter surface, a fourth outer diameter surface positioned between and connected to the third outer diameter and the fifth outer diameter surface and having a diameter less than the third outer diameter and a fifth outer diameter surface, the fifth outer diameter surface connected to the proximal end.

16. A method of use to protect against leaks in a gate valve during operation, the method comprising:

flowing fluid through a throughbore of a valve body of a gate valve, the valve body also including (a) a gate to control fluid flow through the throughbore, (b) a valve seat, (c) a bore, (d) a seat pressure seal positioned between the bore and the valve seat to provide a constant sealing power during a movement of the gate that controls fluid flow through the throughbore, and (e) a debris protection seal in abutting contact with a distal radial wall of the valve body;

causing an elongated debris trajectory by an increase of surface area with a grooved pattern positioned between the debris protection seal and the distal radial wall when the fluid flows through the throughbore so as to reduce a risk of debris interference of the constant sealing power of the seat pressure seal during fluid flow operation;

moving the gate to substantially stop fluid flow through the throughbore so as to produce an axial force applied to the valve seat; and engaging one or more debris cavities positioned on a distal surface of the valve seat to a distal radial wall responsive to the movement of the gate, thereby to capture debris that bypassed the debris protection seal during fluid flow operation and reduce debris migration to the seat pressure seal.

17. The method of claim 16, further comprising:
compressing, in response to the axial force applied to the valve seat, an o-ring positioned to drive the debris protection seal to maintain abutting contact with the distal radial wall, thereby to maintain the elongated debris trajectory during and after movement of the gate and reduce debris infiltration towards the seat pressure seal.

18. The method of claim 16, wherein the seat pressure seal comprises a first seat pressure seal and the method further comprising:
sealingly expanding a second seat pressure seal in a radial direction to seal between the bore and the valve seat to produce a redundant seal with the first seat pressure seal as a response to the movement of the gate, thereby to increase a sealing power of the gate valve when the gate valve substantially is closed.

19. The method of claim 16, wherein the seat pressure seal comprises a first seat pressure seal, wherein the valve seat further includes a first one of: (a) a second seat pressure seal positioned in a first pocket of the valve seat, wherein the first seat pressure seal is positioned in a second pocket of the valve seat, wherein the debris protection seal is positioned in a seal recess of the valve seat, and wherein the one or more debris cavities are positioned between the first pocket and the seal recess.

20. The method of claim 16, wherein the valve seat further includes an alignment collar positioned in a first pocket of the valve seat, wherein the seat pressure seal is positioned in a second pocket of the valve seat, wherein the debris protection seal is positioned in a seal recess of the valve seat, wherein the one or more debris cavities are positioned between the first pocket and the seal recess, and wherein the alignment collar is configured to align the valve seat in the bore such that other seals provide substantially even sealing power between the valve seat and the bore.

21. The gate valve of claim 1, wherein the debris protection seal further includes an o-ring positioned between the valve seat and the debris protection seal within the seal recess, and wherein the debris protection seal is thrusted towards the distal radial wall by the o-ring such that the o-ring is compressed to energize the debris protection seal into abutting contact with the distal radial wall of the valve body, thereby to reduce debris migration towards the seat pressure seal when in operation.

22. The gate valve of claim 9, wherein the valve seat further comprises: (c) a seat pressure seal positioned in abutting contact between the bore and the valve seat to provide a seal power to reduce leaks during fluid flow operation, and wherein the debris protection seal and the one or more debris cavities reduce debris migration to seat pressure seal, thereby to reduce a risk of leaks from debris interference of the sealing power of the seat pressure seal.

23. The gate valve of claim 22, wherein the seat pressure seal comprises a male portion engaged with a female portion in abutting contact to compress axially, thereby to sealingly expand radially.

24. The method of claim 16, wherein the debris protection seal includes a distal surface in abutting contact with a distal radial wall, the distal surface of the debris protection seal includes the grooved pattern positioned therein that increases the surface area between the debris protection seal and the distal radial wall, thereby to cause the elongated debris trajectory between the debris protection seal and the distal radial wall.

25. The method of claim 24, wherein the grooved pattern comprises a spiral so as to increase surface area to elongate the debris path by the debris particle to reach a seat pressure seal, thereby to reduce a risk of leaks from debris interference of a sealing power of the seat pressure seal when in operation.

26. A gate valve comprising:
a valve actuator;
a gate connected to the valve actuator so that the valve actuator actuates the gate during fluid flow operation;

a valve body having a throughbore extending through the valve body, a cavity having an opening positioned transversely to and in fluid communication with the throughbore to position the gate therein, and a profile at a connection of the throughbore and the cavity, the profile including a bore concentrically aligned with the throughbore and a tapering portion positioned to extend from the cavity to the bore, the bore having a diameter greater than the throughbore and a distal radial wall extending from the bore to the throughbore; and a valve seat positioned in the bore, the valve seat includes a distal end, a proximal end, an inner diameter surface, and an outer diameter end, and the valve seat is defined by one of the following (a) or (b):

(a) the distal end having an outer edge defined by a connection of a first outer diameter surface and the distal surface of the valve seat, the distal surface extending from the outer edge to the inner diameter surface of the valve seat and including, in sequence, one or more debris cavities, a seal recess, and a ledge defined by the seal recess and a connection of the distal surface and the inner diameter surface of the valve seat, the proximal end having has a proximal surface extending from a first angled wall connected to another outer diameter surface of the valve seat and a second angled wall connected to the inner diameter surface of the valve seat, the inner diameter surface having a diameter substantially similar to a diameter of the throughbore and extending from the second angled wall of the proximal end to the ledge, the inner diameter surface further having a recess to engage a retraction tool during maintenance, and the outer diameter end having a first pocket defined by the outer edge and a connection between the first outer diameter surface and a radial projection, the first pocket configured to position a seat pressure seal therein when installed, the radial projection separating the first pocket and a second pocket and further having a second outer diameter surface extending between the first pocket and the second pocket, the second pocket defined by the radial projection, a third outer diameter surface, and a radial wall extending from the third outer diameter surface to a shoulder connecting a fourth outer diameter surface to the radial wall, the second pocket configured to position a second seat pressure seal therein when installed, the outer diameter end further having a fifth outer diameter surface, a third angled wall extending from the fifth outer diameter surface to the sixth outer diameter surface, and the fifth outer diameter surface having a diameter greater than the fourth outer diameter surface or the sixth outer diameter surface, or (b) the distal end having an outer edge defined by a connection of a first outer diameter surface and the distal surface of the valve seat, the distal surface extending from the outer edge to the inner diameter surface of the valve seat and including, in sequence, one or more debris cavities, a seal recess, and a ledge defined by the seal recess and a connection of the distal surface and the inner diameter surface of the valve seat, the proximal end having a proximal surface extending from a fifth outer diameter surface of the valve seat to the inner diameter surface of the valve seat, the inner diameter surface having a diameter substantially similar to a diameter of the throughbore and extending from the proximal end to the distal end, and the outer diameter end having a pocket defined by the outer edge and a connection between the first outer diameter surface and a radial projection, the pocket configured to position a seat pressure seal therein when installed, the radial projection having a second outer diameter surface extending from the pocket to a seat profile, the seat profile extending between the second outer diameter surface and a third outer diameter surface and having an inner diameter less than a diameter of second outer diameter surface, the third outer diameter surface having a diameter greater than the diameter of second outer diameter surface, a fourth outer diameter surface positioned between and connected to the third outer diameter and the fifth outer diameter surface and having a diameter less than the third outer diameter and a fifth outer diameter surface, the fifth outer diameter surface connected to the proximal end.

27. The gate valve of claim 26, wherein the seal recess is configured to position a debris protection seal therein for abutting contact with the distal radial wall of the bore.

28. The gate valve of claim 27, wherein the seal recess further is configured to position a o-ring between the valve seat and the debris protection seal, and wherein the debris protection seal is thrusted towards the distal radial wall by the o-ring such that the o-ring is compressed to energize the debris protection seal into abutting contact with the distal radial wall of the valve body, thereby to reduce debris migration towards the seat pressure seal when in operation.

29. The gate valve of claim 27, wherein the one or more debris cavities is configured to capture debris between the distal surface of the valve seat and the distal radial wall of the bore.

30. The gate valve of claim 26, wherein the valve seat further comprises: (c) a seat pressure seal positioned in abutting contact between the bore and the valve seat to provide a seal power to reduce leaks during fluid flow operation, and wherein the debris protection seal and the one or more debris cavities reduce debris migration to seat pressure seal, thereby to reduce a risk of leaks from debris interference of the sealing power of the seat pressure seal.

* * * * *